United States Patent
Flikkema et al.

(10) Patent No.: US 11,976,773 B2
(45) Date of Patent: May 7, 2024

(54) SYSTEM FOR ADJUSTABLY HANGING AN ITEM FROM A POLE

(71) Applicant: Flikkema's LLC, Allendale, MI (US)

(72) Inventors: Steven J. Flikkema, Allendale, MI (US); Grant J. Flikkema, Grand Rapids, MI (US)

(73) Assignee: Fikkema's LLC, Allendale, MI (US)

( * ) Notice: Subject to any disclaimer, the term of this patent is extended or adjusted under 35 U.S.C. 154(b) by 8 days.

(21) Appl. No.: 17/813,707

(22) Filed: Jul. 20, 2022

(65) Prior Publication Data

US 2023/0026472 A1 Jan. 26, 2023

Related U.S. Application Data

(60) Provisional application No. 63/203,495, filed on Jul. 26, 2021.

(51) Int. Cl.
*F16M 11/04* (2006.01)
*F16M 11/18* (2006.01)

(52) U.S. Cl.
CPC ........... *F16M 11/046* (2013.01); *F16M 11/18* (2013.01)

(58) Field of Classification Search
CPC ...... F16M 11/046; F16M 11/18; F16M 11/24; E04H 12/20
USPC ............................... 248/125.1, 125.2, 122.1
See application file for complete search history.

(56) References Cited

U.S. PATENT DOCUMENTS

| | | | | |
|---|---|---|---|---|
| 1,470,698 A | * | 10/1923 | Nelson | A61N 5/01 362/418 |
| 2,967,458 A | * | 10/1961 | Stone, Jr. | F16M 11/42 359/384 |
| 3,288,412 A | * | 11/1966 | Thomas, V | G09F 1/14 40/604 |
| 3,534,880 A | * | 10/1970 | Gunn | B62B 3/0637 414/458 |
| 5,971,348 A | * | 10/1999 | Thomas | F16M 11/18 248/661 |
| 6,640,934 B1 | * | 11/2003 | Edwards | B66B 9/00 187/254 |
| 7,429,035 B2 | * | 9/2008 | Metcalf | B66C 23/48 254/4 B |
| 8,979,072 B2 | * | 3/2015 | Vandegrift | E04H 12/20 254/387 |
| 10,279,751 B2 | * | 5/2019 | Hintz | B62J 7/04 |
| 10,663,105 B2 | * | 5/2020 | Chen | F16M 11/2014 |
| 11,353,156 B2 | * | 6/2022 | Govekar | F16M 11/24 |

(Continued)

*Primary Examiner* — Eret C McNichols
(74) *Attorney, Agent, or Firm* — HONIGMAN LLP

(57) ABSTRACT

A hanging system includes a bracket configured to adjustably mount at a pole and a rope extending through a pulley at the pole. The bracket includes a body defining a passageway and an arm extending from the body and including a hanging element. The passageway receives the pole. When the bracket is mounted at the pole, the rope is connected at a connecting element of the bracket, extends upward along the pole, through the pulley, and downward along a channel formed along the bracket. With no external force applied at the rope, an inner surface of the body engages the pole to, due to a frictional force between the bracket and pole, retain the bracket at a position along the pole. Responsive to an external force applied at the rope in the downward direction, the external force overcomes the frictional force and the bracket moves upward along the pole.

22 Claims, 29 Drawing Sheets

(56) References Cited

U.S. PATENT DOCUMENTS

| | | | |
|---|---|---|---|
| 11,525,541 B2* | 12/2022 | Govekar | F16M 11/18 |
| 11,697,445 B2* | 7/2023 | Leblanc | B66C 23/36 |
| | | | 414/630 |
| 2010/0303603 A1* | 12/2010 | Galante | F16M 13/00 |
| | | | 414/811 |
| 2013/0284864 A1* | 10/2013 | Vandegrift | F16M 11/18 |
| | | | 254/387 |
| 2019/0226629 A1* | 7/2019 | Chen | F16M 11/2014 |
| 2021/0139063 A1* | 5/2021 | Leblanc | B66C 23/18 |

* cited by examiner

SYSTEM FOR ADJUSTABLY HANGING AN ITEM FROM A POLE

CROSS REFERENCE TO RELATED APPLICATION

The present application claims the filing benefits of U.S. provisional application Ser. No. 63/203,495, filed Jul. 26, 2021, which is hereby incorporated herein by reference in its entirety.

FIELD OF THE INVENTION

The present invention relates generally to a system for hanging items from a pole and, more particularly, a system for hanging items from a pole that allows for adjustability of the height of the items along the pole.

BACKGROUND OF THE INVENTION

Poles, such as a flag pole, having external raising assemblies are known and generally provide a rope or cable adjustable relative to a length of the pole via a pulley or other suitable system. Typically, the rope in such systems presents two lengths along the pole and is adjustable such that pulling downward on one length of rope raises the other length of rope and vice versa. A flag is typically fixed to one of the lengths of rope such that a position of the flag along the length of the pole may be adjusted via adjustment of the rope along the length of the pole.

SUMMARY OF THE INVENTION

A hanging system includes a bracket configured to adjustably mount at a pole, with the bracket having a body configured to receive the pole therethrough. An arm extends laterally from the body and includes a hanging element at an end of the arm distal from the body. First and second through holes are formed through a portion of the bracket and are configured to receive respective first and second lengths or portions of a rope therethrough. The rope is adjustable along the pole such that adjustment of the first length of rope in a first direction along the pole results in adjustment of the second length of rope in a second direction along the pole opposite the first direction. With the bracket adjustably mounted at the pole, (i) the pole is received through the body, (ii) the first length of rope passes through the first through hole, and (iii) the bracket is fixed relative to the second length of rope so as to be adjustable along the pole according to adjustment of the rope.

A bracket configured to adjustably mount at a pole includes a body defining a passageway along a length of the body. An arm extends laterally from the body and includes a hanging element along the arm and spaced from the body. The bracket, when adjustably mounted at the pole, receives the pole along the passageway of the body. When the bracket is adjustably mounted at the pole, a first end of a rope is connected at a connecting element of the bracket and a length of the rope extends from the first end in an upward direction along the pole, through a pulley at or near an upper end of the pole. A first portion of the length of the rope extends from the pulley at or near the upper end of the pole and in a downward direction along the pole, where the first portion of the length of the rope extends along the length of the body of the bracket. When the bracket is adjustably mounted at the pole and responsive to no force applied at the rope, an inner surface of the passageway of the body engages the pole to, at least in part due to a frictional force between the bracket and the pole, retain the bracket at a position along the pole. When the bracket is adjustably mounted at the pole and responsive to an external force applied at first portion of the length of the rope in the downward direction along the pole, the external force overcomes the frictional force and the bracket moves in the upward direction along the pole to adjust the position of the bracket along the pole.

These and other objects, advantages, purposes and features of the present invention will become apparent upon review of the following specification in conjunction with the drawings.

DESCRIPTION OF THE PREFERRED EMBODIMENTS

A system for hanging items from a pole (referred to herein as a hanging system) that allows for adjustability of the items along the pole allows a user to position a hanging item, such as a bird feeder or suet feeder or a basket for hanging flowers or a spotlight or the like, at a desired height along the pole. The pole, such as a flagpole or any other suitable pole, is erected or mounted, such as from the ground or a mounting bracket at the side of a structure, and includes an external raising assembly. For example, the pole may include an external raising assembly similar to those traditionally used to raise and lower flags along a flagpole, that includes a rope or cable or the like, adjustable along the length of the pole such as via a pulley system. The hanging system is configured to receive the pole and receive a hanging item, and is adjustable along the length of the pole via adjustment of the rope to adjust the height or position of the hanging item along the length of the pole. The hanging system is adjustable to allow the hanging item to be set at any height along the pole. Further, the hanging system, when set at a given height along the pole and while under any load from accommodating the hanging item, remains stable and aligned relative to the pole to hold the hanging item in place.

Hanging items, such as outdoor items like bird feeders, flower baskets, and lighting systems, at an extended height off the ground is often desirable. For example, while some research shows that bird feeders are recommended to be placed 5 to 8 feed off the ground, establishing a feeder at up to 20 feet off the ground may reduce the chances of squirrels or other destructive animals from reaching the bird feeders and allow for easier viewing of bird feeders out of windows at the second story or higher.

However, systems for positioning such items at extended heights is uncommon because, for example, it is difficult to frequently raise and lower items, such as bird feeders, from extended heights down to ground level, such as to refill seed. Current options for placing these items outdoors at extended heights include window suction cups and window-mounted feeders, which all present difficulties for users to lower or access the items. Furthermore, installation of permanent hangers at extended heights requires ladders or assistive devices to lower or access the items hung from such permanent hangers.

Figure 1:
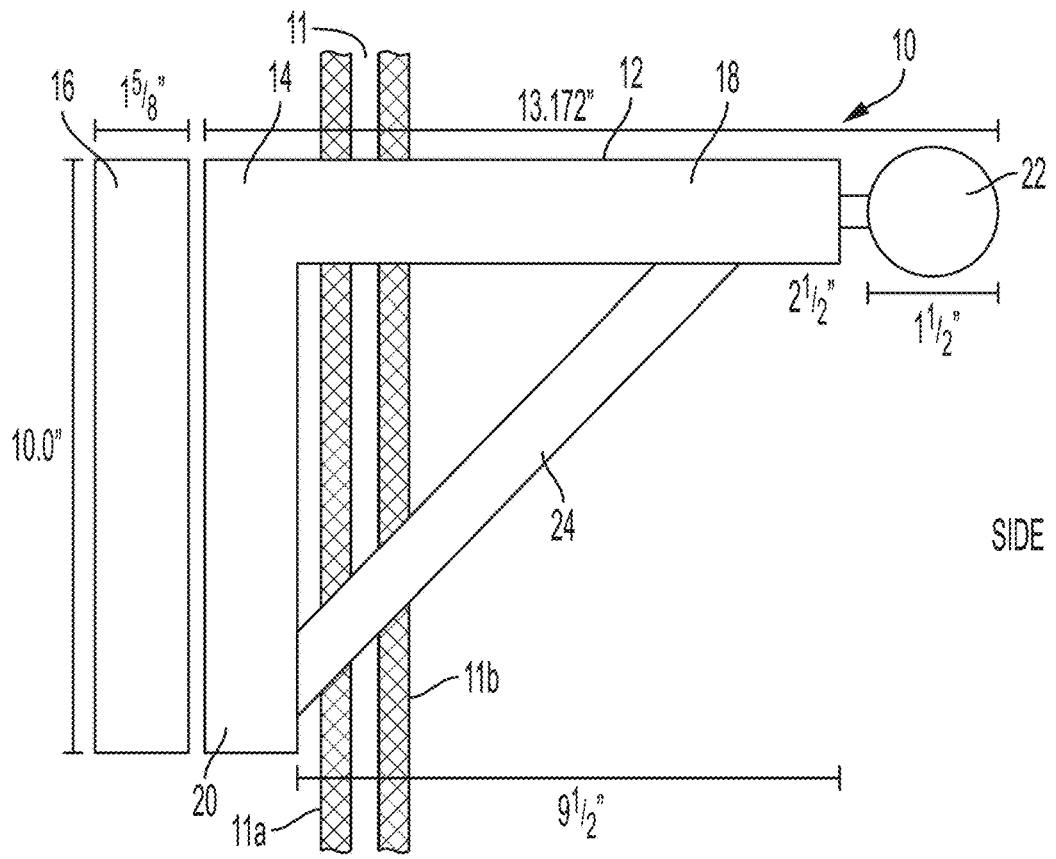
FIG. 1 is a side plan view of a bracket that is configured to receive a pole between two portions of the bracket and that is adjustable along a length of the pole via adjustment of a rope received at the bracket.
Figure 2:
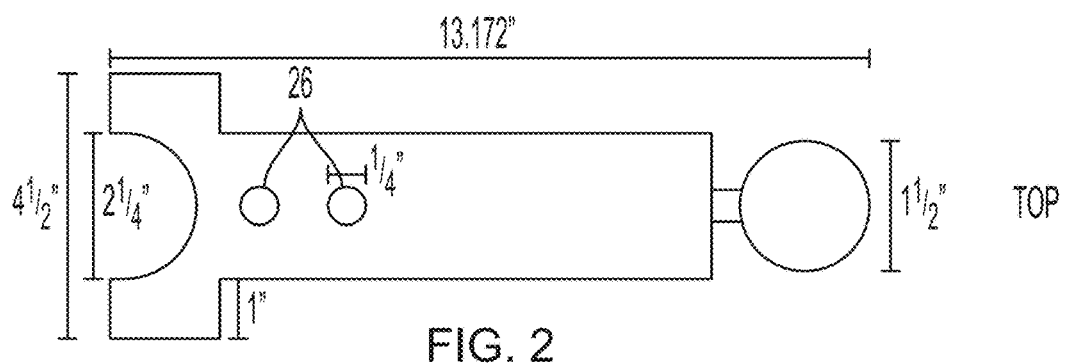
FIG. 2 is a top plan view of a hanging or receiving or front portion of the bracket.
Figure 3:
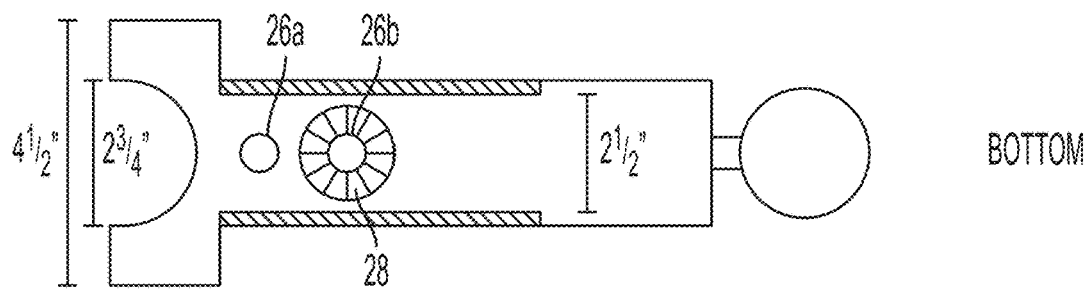
FIG. 3 is a bottom plan view of the hanging portion of the bracket.
Figure 4A:
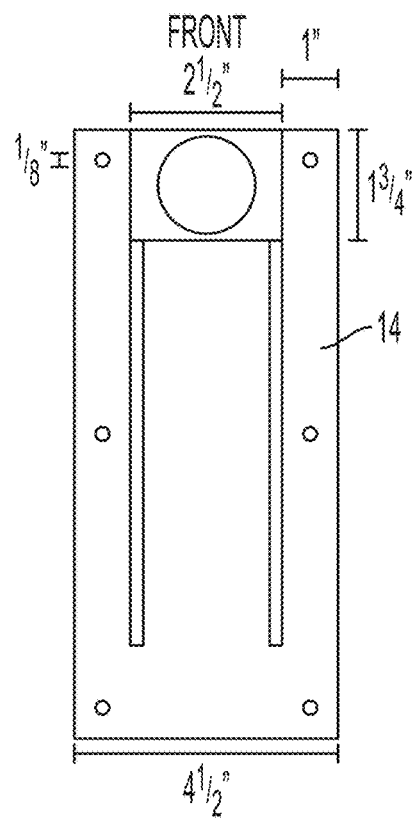
FIG. 4A is a front side plan view of the hanging portion of the bracket.
Figure 4B:
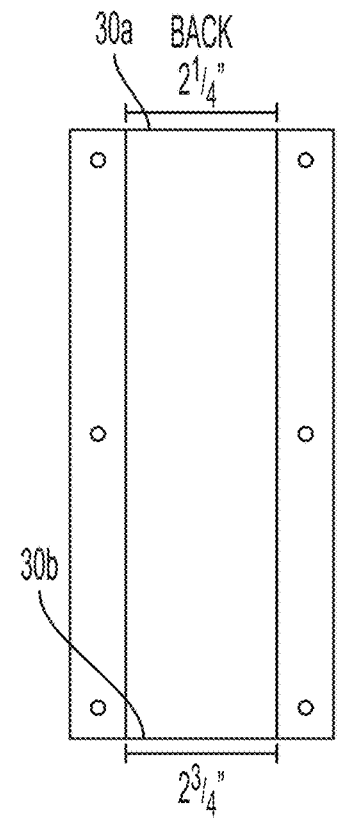
FIG. 4B is a back side plan view of the hanging portion of the bracket.
Figures 5A, 5B, 5C:
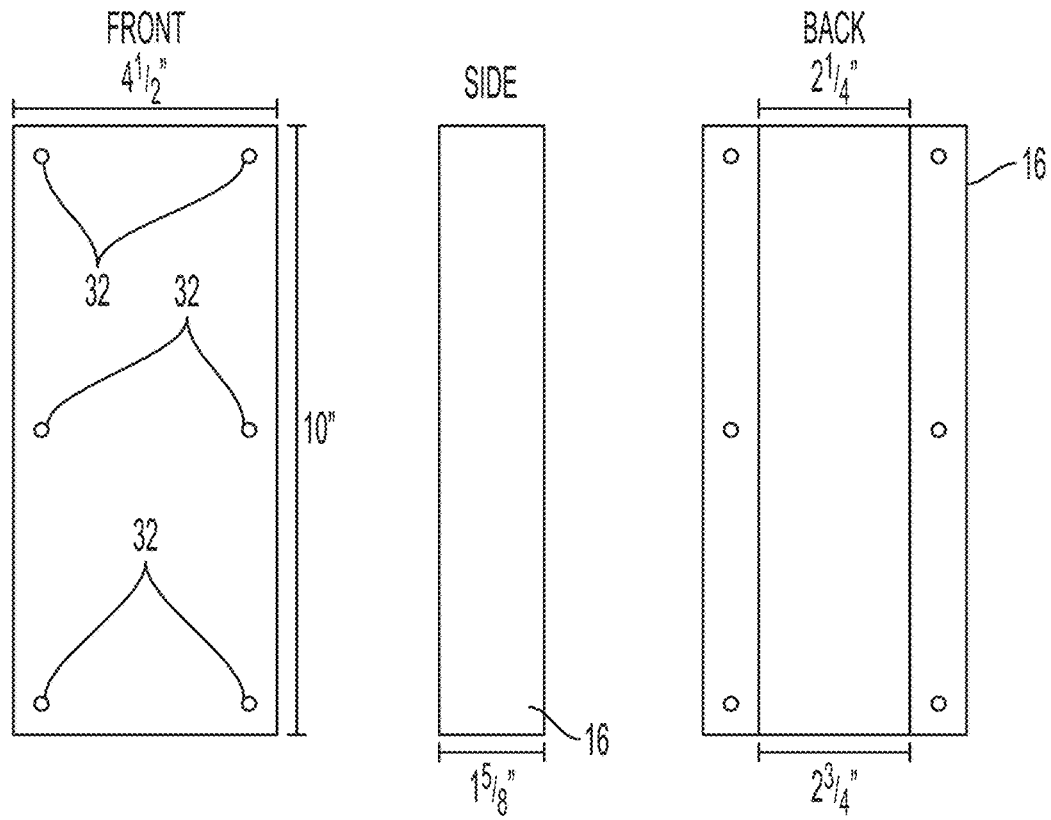
FIG. 5A is a front side plan view of a retaining or rear portion of the bracket.
FIG. 5B is a side plan view of the retaining portion of the bracket.
FIG. 5C is a back side plan view of the retaining portion of the bracket.
Figure 6:
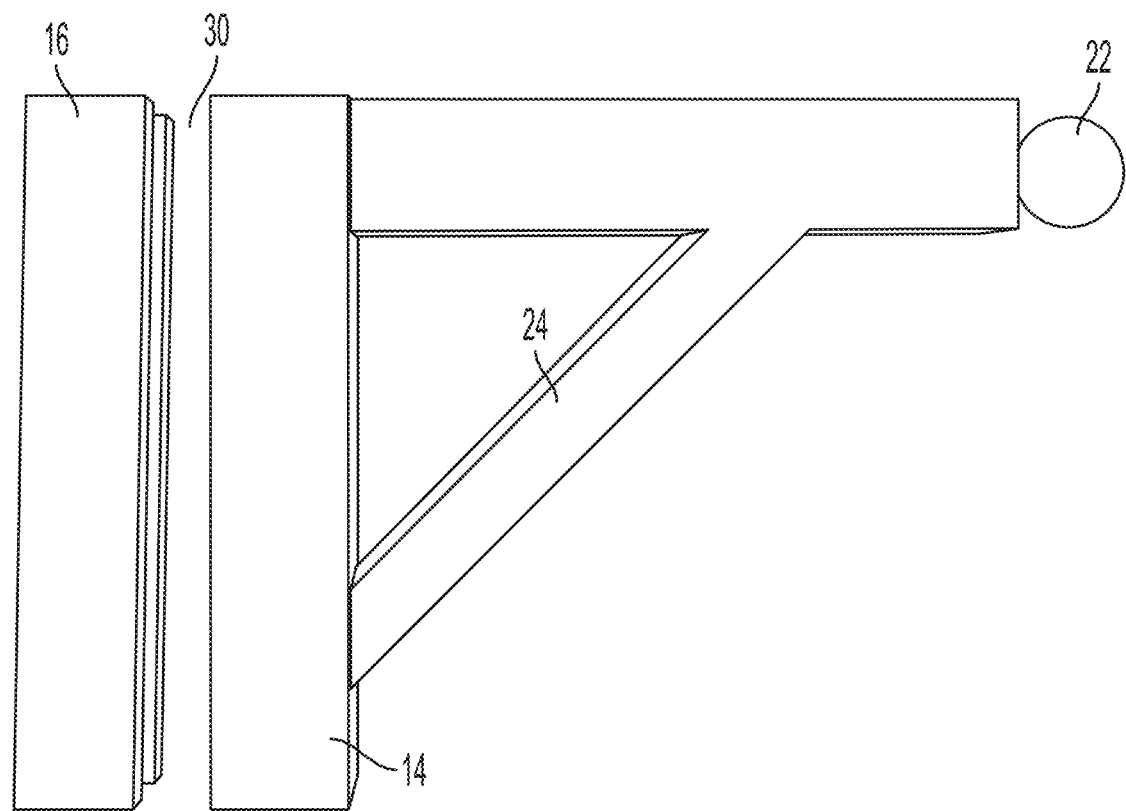
FIG. 6 is a side view of the bracket.
Figure 7:
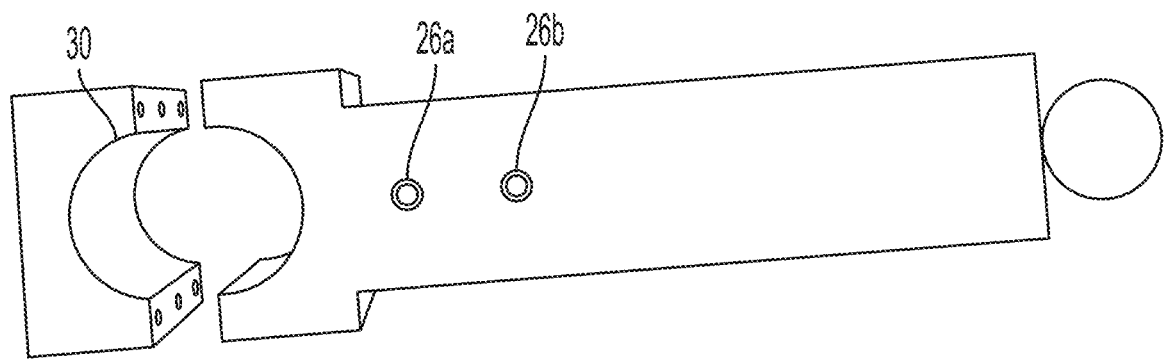
FIG. 7 is a top view of the bracket.

Referring now to the drawings and the illustrative embodiments depicted therein, the hanging system 10 includes a bracket 12 that receives a hanging item and that is configured receive a pole at a passageway 30 therethrough (FIG. 1). When the bracket 12 is mounted at the pole, the bracket (and therefore hanging item) is adjustable along the length of the pole via adjustment of a cable or rope 11 along the pole. In the illustrated embodiment, the bracket comprises a two-piece bracket that includes a hanging or receiving or front portion 14 and a retaining or rear portion 16, the front and rear portions configured to clamp or join or be secured together around the pole and receive the pole at the passageway 30 formed through the bracket 12. The passageway 30 comprises a conical passageway that allows for easier adjustment in height of the bracket along the pole, as discussed below.

Figure 8:
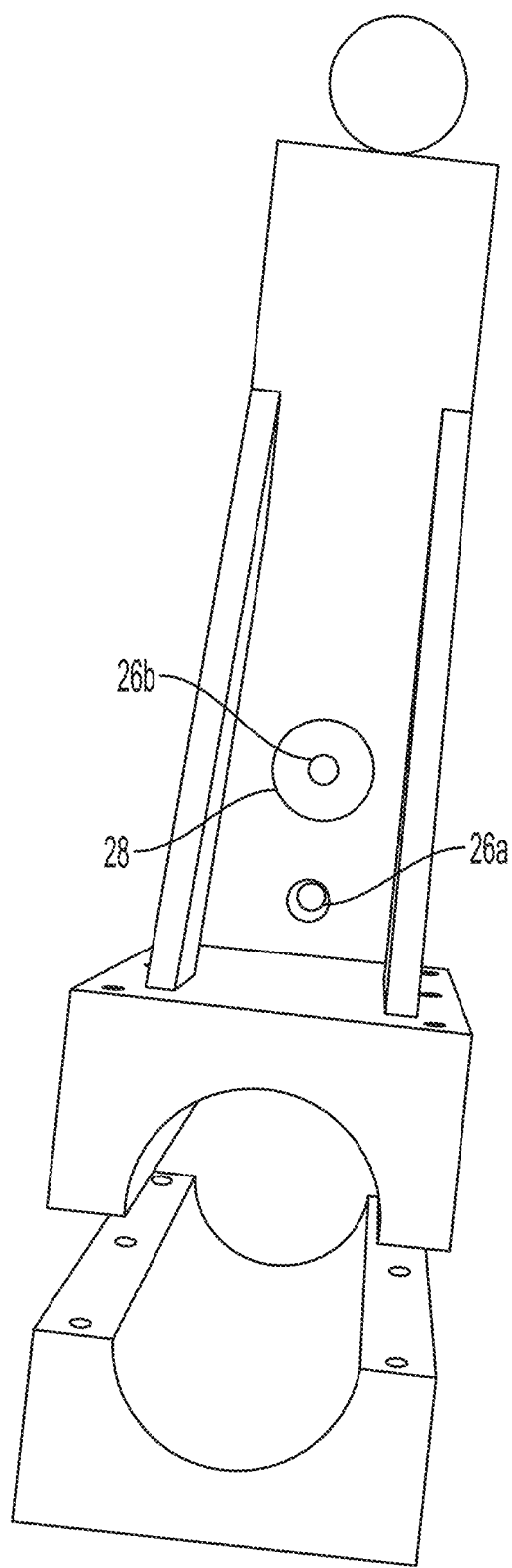
FIG. 8 is a bottom view of the bracket.
Figure 14:
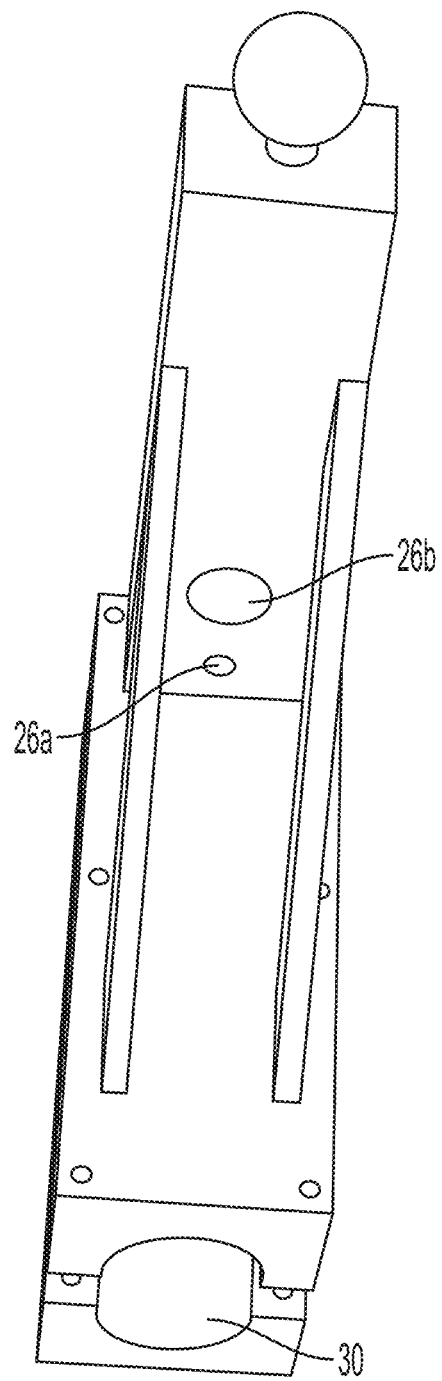
Figure 15:
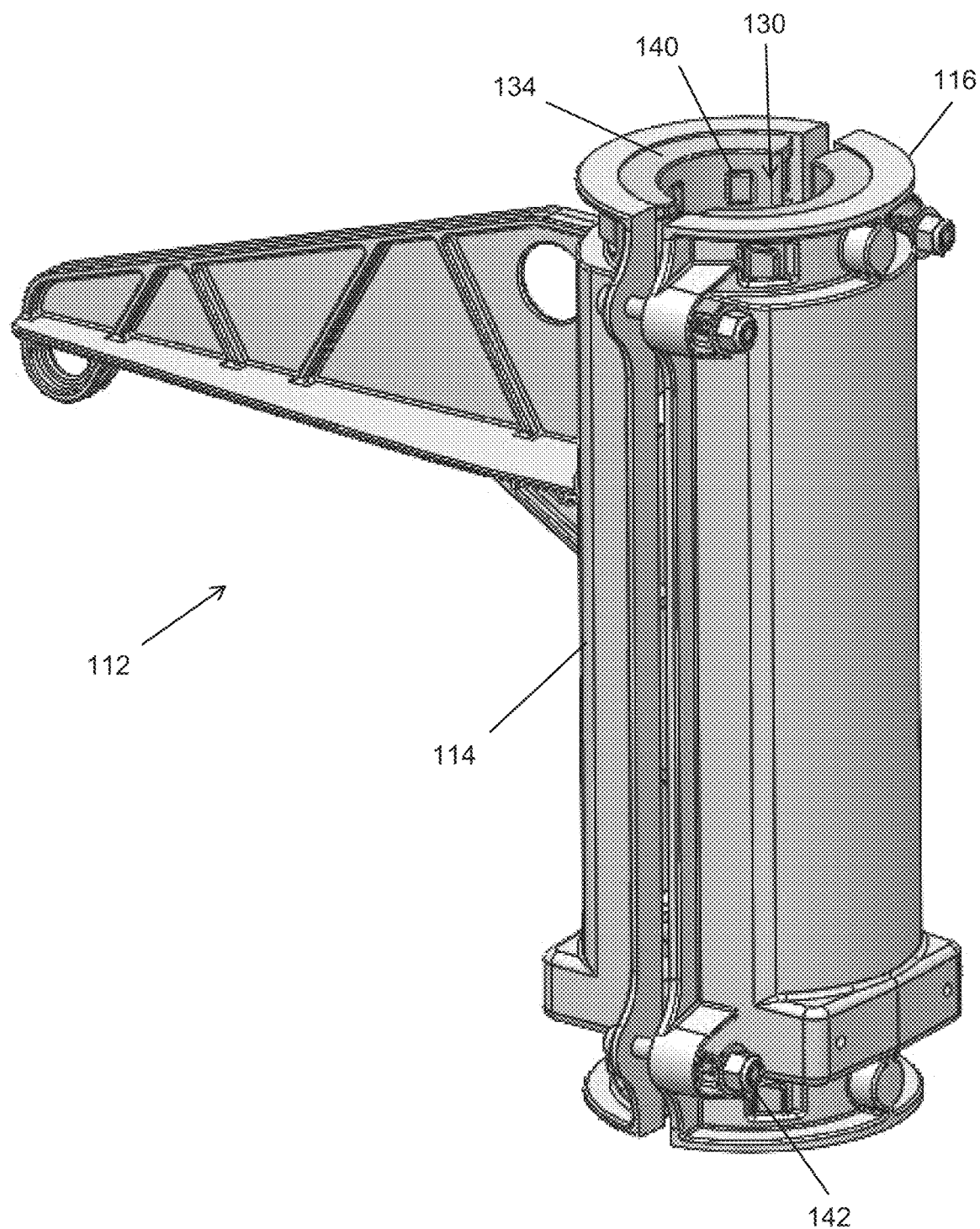
FIG. 15 is a perspective view of another bracket.

The front portion 14 of the bracket 12 includes an arm 18 extending laterally from a body 20 of the front portion of the bracket, with a hanging element 22 disposed at an end of the arm 18 distal from the body 20 and configured to receive or engage or support the hanging item thereat. One or more supports 24 connect between the body 20 and a position along the arm 18 that is between the hanging element 22 and the body 20 to enhance the strength and rigidity and stability of the arm 18. In the illustrated embodiment, the support 24 comprises two lateral support arms 24a, 24b parallel to one another. As shown in FIGS. 1, 8, and 14, the lateral support arms 24a, 24b are positioned at the respective outer side edges of the arm 18 so as to permit passage of the rope 11 between the support arms.

Two through holes 26 are formed vertically through the arm 18 and are configured to receive respective lengths or portions or sections of the rope 11. Optionally, the through holes 26 may pass through the support such as to further stabilize the bracket relative to the rope 11 or hide the connection between the rope and the bracket. As will be discussed further below, an inner or proximal through hole 26a nearest the body 20 of the front portion along the arm 18 is configured to allow for travel of a first length of rope 11a through the arm 18 and an outer or distal through hole 26b further outboard from the body 20 along the arm 18 is configured to fix the bracket 12 relative to the second length of rope 11b so that adjustment of the rope along the length of the pole results in adjustment of the bracket 12 along the pole.

The external raising assembly is configured to allow a user to adjust the position of the rope 11 along the length of the pole to adjust the position of the hanging system 10 (and therefore hanging item) along the length of the pole. For example, the pole may extend from the ground or be mounted to the side of a structure and include a pulley system at or near a distal or top end of the pole, where the rope 11 is looped over or passed through or doubled back at the pulley system such that two lengths or portions of rope 11a, 11b are along the length of the pole and adjustment of the first length of rope 11a along the length of the pole results in opposite movement of the second length of rope 11b along the pole. In other words, pulling the first length of rope 11a downward or applying a force at the first length of rope in the downward direction along the pole results in the movement of the second length of rope 11b and the bracket in an upward direction along the pole and vice versa. It should be understood that any suitable pole and pulley system may be used, such as a vertically mounted pole extending from the ground, a horizontally mounted pole extending perpendicularly from a building or attachment surface, or an oblique mounted pole extending from a building or attachment surface or structure at an oblique angle relative to the attachment surface. Although the relative direction of the pole may be horizontal or even pointing downward from the attachment surface toward the ground, reference to a lower end of the pole should be understood to include the end of the pole mounted to the ground or attachment surface or structure and reference to an upper end of the pole should be understood to include the end of the pole distal from the attachment surface or structure. Thus, movement of the rope or bracket along the pole in an upward direction may refer to movement along the pole from the lower end toward the upper end and movement of the rope or bracket along the pole in a downward direction may refer to movement along the pole from the upper end toward the lower end. Optionally, the external raising assembly may be an already existing flagpole, with the bracket 12 configured to attach or mount at the flagpole in a manner described herein to enable a hanging item to be positioned along the flagpole.

As shown in FIGS. 1-3, 7 and 8, the proximal hole 26a in the arm 18 of the bracket 12 is configured to receive the first length of rope 11a and the distal hole 26b is configured to receive the second length of rope 11b. The proximal hole 26a allows for travel of the rope through the bracket 12 and the distal hole 26b includes an engagement portion for fixing the bracket 12 relative to the second length of rope 11b. For example, in the illustrated embodiment the engagement portion is a portion of the distal hole 26b having a larger diameter or a hemisphere or a funnel or conical recess 28 configured to receive a knotted portion of the second length of rope 11b. Thus, the bracket 12 rests on the knotted portion of the second length of rope 11b so that, when the second length of rope 11b is raised and lowered (by pulling downward on or releasing the first length of rope), the bracket 12 is adjusted along the length of the pole via adjustment of the rope 11. Although shown as formed through the arm 18 of the bracket, it should be understood that the through holes 26 may be formed through any suitable portion of the bracket 12, such as the body 20.

The through holes 26 of the illustrated embodiment allow for multiple brackets to be positioned at discrete positions along the rope 11 so that multiple hanging items may be adjustably positioned along the length of the pole. For example, positioning a plurality of brackets 12 along the rope 11 such that each bracket rests upon a respective knotted portion of the second length of rope 11b allows the plurality of brackets to be adjusted in tandem via adjustment of the rope. Also, the knotted portion of the second length of rope 11b may be positioned at any point along the rope, such as relative to a flag positioned on the rope, to hang the bracket at any desired height relative to any potential other item on the rope.

Additionally, the engagement portion 28 may be configured to retain the bracket relative to the second length of rope in any suitable manner. For example, the engagement portion 28 in the illustrated embodiment is shown as a conical recess, but may comprise a spring-loaded clip or any other suitable retaining element. Although shown as receiving the first length of rope 11a at the proximal hole 26a and receiving a knotted portion of the second length of rope 11b at an engagement portion 28 of the distal hole 26b, it should be understood that the bracket 12 may receive and be adjustable along the length of the pole in any suitable way. For example, the engagement portion may be a hook or grommet configured to receive an end portion of the second length of rope 11b to fix the position of the bracket 12 along the second length of rope 11b.

The bracket 12 includes the passageway or receiving portion 30 configured to receive the pole therethrough. The passageway 30 is configured to wrap around the pole with clearance for the bracket to slide up and down along the pole. However, the passageway 30 may not be so large as to allow for significant movement of the bracket relative to the pole, such as when the bracket is being adjusted relative to the pole or due to wind. Thus, as the bracket 12 is raised and lowered along the pole, the passageway travels along the pole and stabilizes the bracket as it is positionally adjusted.

As mentioned above, the passageway 30 may be conically tapered from the bottom of the bracket towards the top of the bracket to ease height adjustment of the bracket along the pole. For example, the bracket 12 is configured to receive a pole having a diameter of 2 inches or less and includes a receiving channel with an upper diameter 30a at the top surface of the bracket of 2¼ inches and a lower diameter 30b at the bottom surface of the bracket of 2¾ inches. It should be understood that the receiving passageway 30 may be dimensioned to suitably receive any diameter pole. The tapered cylindrical passageway of the bracket (with the larger diameter end being at the lower end of the bracket and the smaller diameter end being at the upper end of the bracket) reduces the likelihood of the bracket binding at the pole when being lowered (where the lowering force is simply provided via gravity when the rope is released). In other words, there will only be a small area (the upper end region) of the bracket that may circumferentially contact the pole, with a larger gap being present elsewhere along the bracket. Any potential binding of the bracket with the pole as the bracket is moved upward can be overcome by pulling at the rope, which allows for easier travel of the bracket up and down along the pole. The tapered cylindrical passageway of the bracket and the clearance between the lower end region of the bracket and the pole causes the bracket, when mounted at the pole and with an item hanging from the hanging element 22, to tilt downward from the weight or load of the hanging item. Thus, the angle of the arm relative to the body portion may not be 90 degrees, so that the arm is generally horizontal when the body is tilted along the pole.

As shown in FIGS. 4-8, the bracket 12 includes separate front and rear portions that are joined together around the pole, with the front and rear portions each having a respective recess or channel that defines a portion of the passageway 30. Thus, the front portion 14 may be joined to the rear portion 16 with the pole received in the passageway 30 between the front and rear portions. This allows for easier installation of the bracket 12 at the pole. The front and rear portions of the bracket 12 may be removably attached to one another in any suitable manner. For example, the front and rear portions include respective through holes 32 that may receive fasteners (such as threaded fasteners such as screws or nut and bolt assemblies) configured to retain the front and rear portions together around the pole.

The arm 18 extends laterally from the body 20 of the front portion 14 of the bracket and includes the hanging element 22 at the end of the arm 18 distal from the body 20. The arm 18 is configured to separate the hanging item from the pole so, for example, the hanging item is less likely to hit the pole such as due to wind or adjustment of the bracket along the pole. For example, the arm 18 may extend from the body eight inches or more to ensure proper separation between the hanging item and the pole. In the illustrated embodiment, the arm 18 comprises a non-curved arm and extends perpendicular to the body 20. However, it should be understood that the arm 18 may comprise any suitable configuration and extend from the body 20 in any suitable manner. For example, the arm may be curved and/or extend at an oblique angle relative to the body 20.

Figure 9:
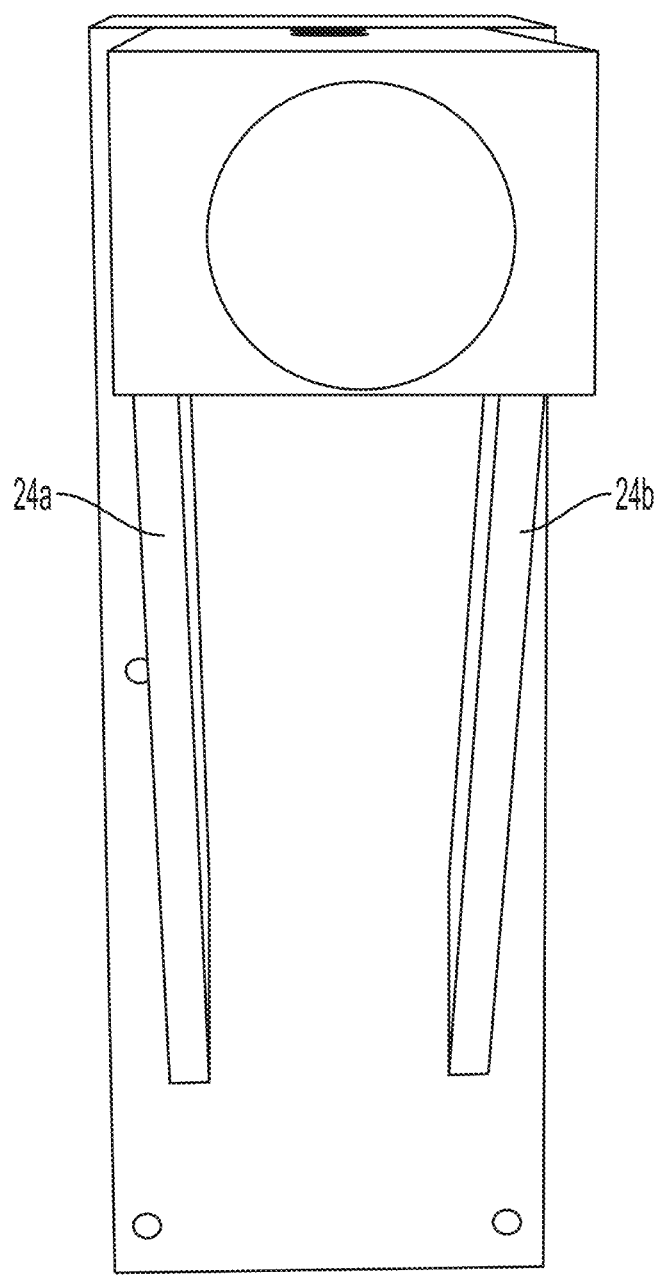
FIG. 9 is front side view of the bracket.

As shown in FIG. 9, the hanging element 22 is configured to receive the hanging item and may comprise any suitable design to retain the hanging item at the end of the arm 18 distal from the body 20. The hanging element 22 may be configured for a specific application, such as to hang bird feeders, flower baskets, or suet feeders, with the hanging element configured to receive a corresponding hanging element of the desired hanging item. For example, the hanging element may be a hook, peg, receiving slot, or any other suitable configuration. Although shown as a discrete component disposed at the end of the arm, the hanging element 22 may be integrally formed with the arm 18, such as an upturned end of the arm or a receiving notch or recess in the arm.

Figure 10:
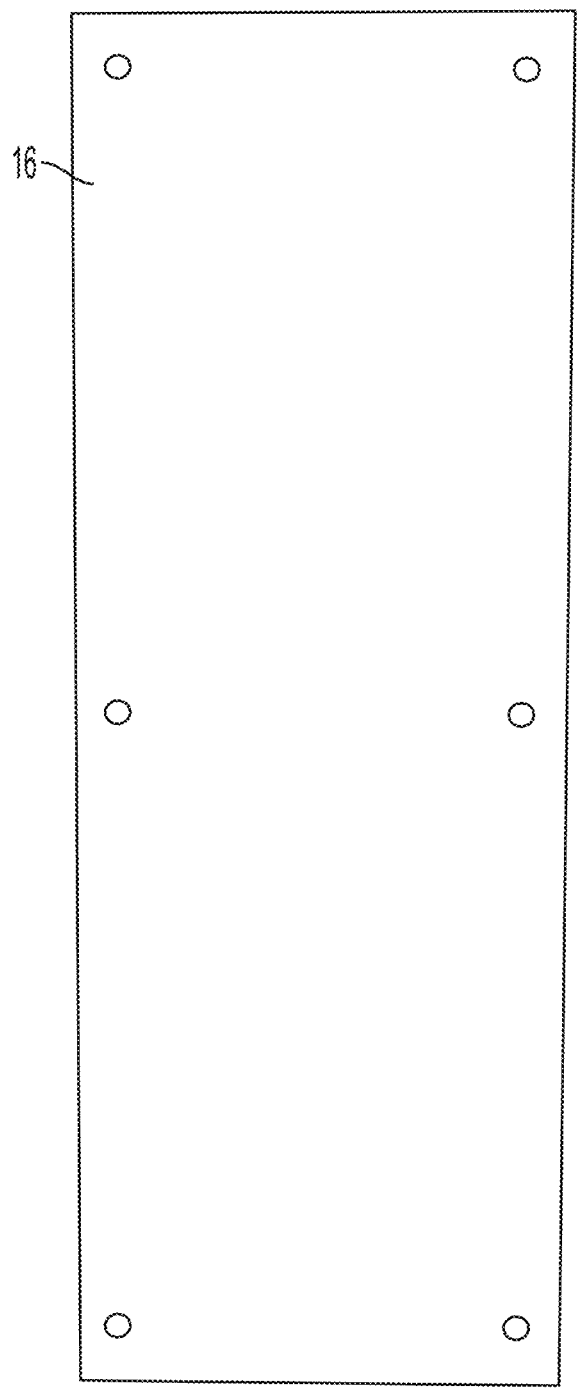
FIG. 10 is a rear side view of the bracket.
Figure 11:
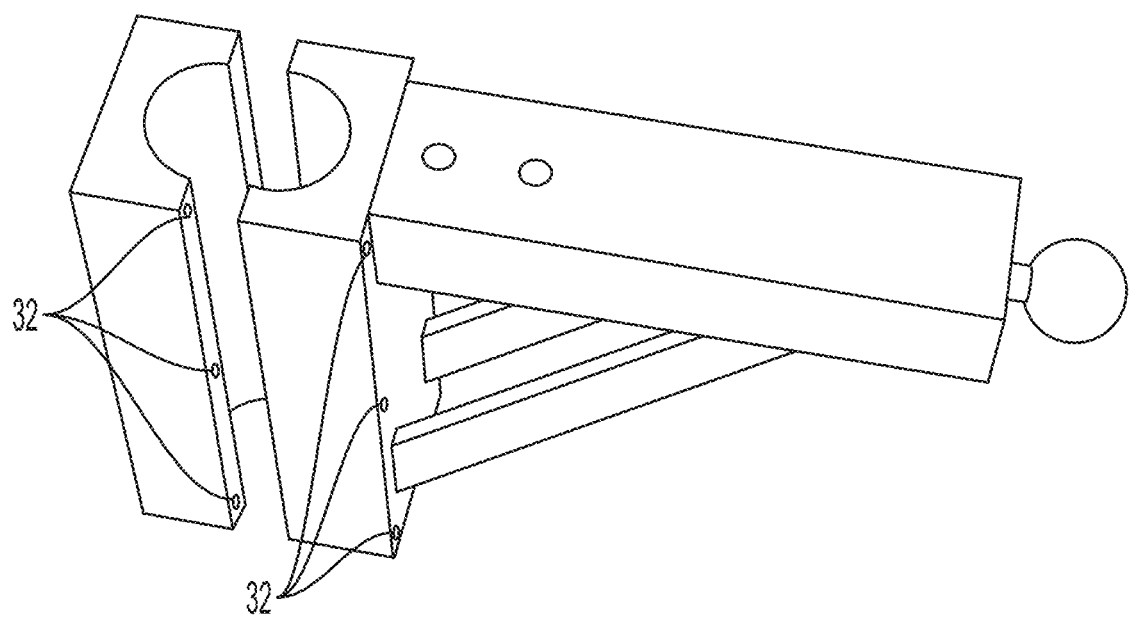
FIGS. 11-14 are perspective views of the bracket.
Figure 12:
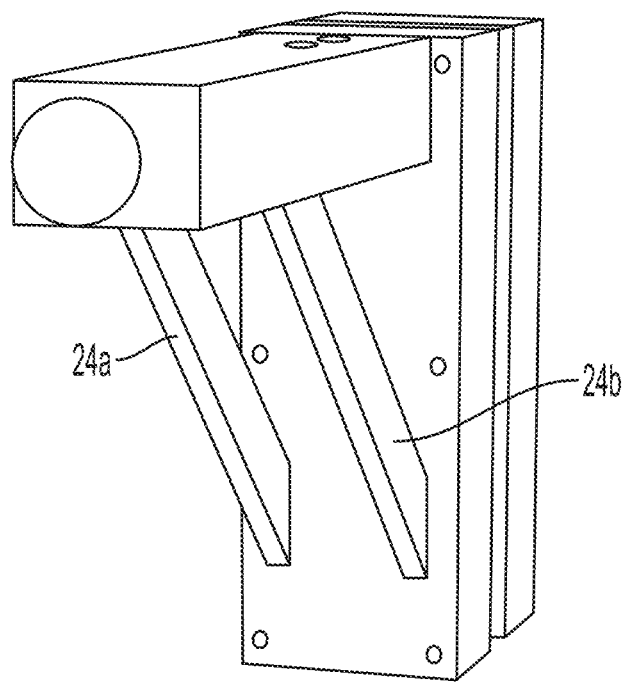
Figure 13:
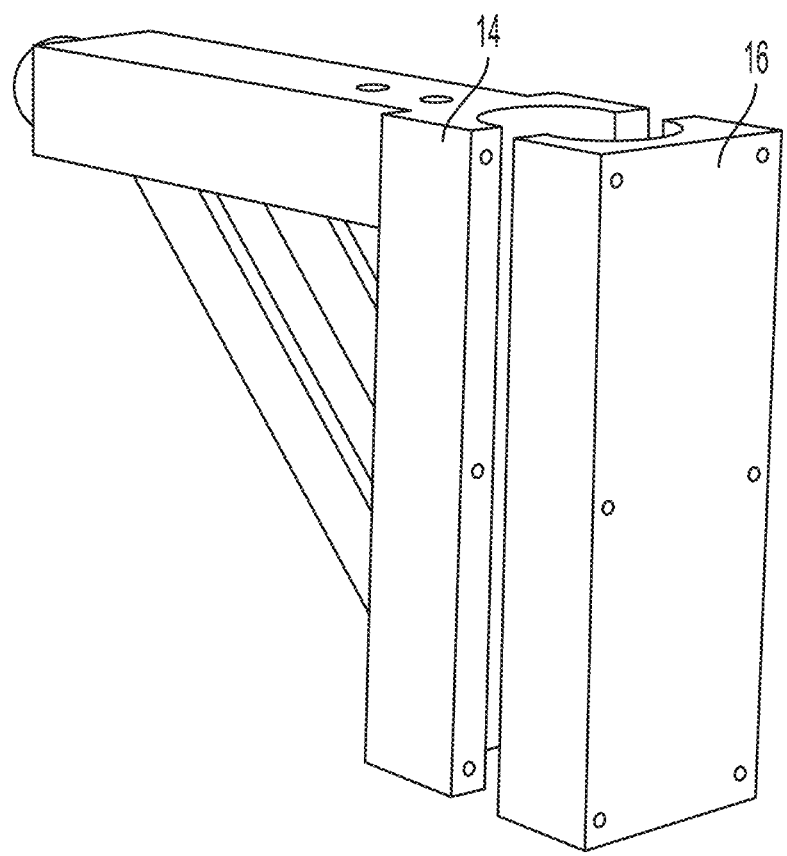

Although the retaining or rear portion 16 of the bracket, such as shown in FIG. 10, is depicted as having flat or featureless outer surfaces, it should be understood that the rear portion may be similarly configured to the front portion 14 such that a second hanging item may hang from an arm extending from the rear portion. For example, the body may comprise two identical or common parts or portions, each having an arm extending therefrom so that the two common parts may be attached together to hang an item from opposite sides of the pole or post. Optionally, the front portion and/or the rear portion of the bracket may include a plurality of arms (each with one or more hanging elements) extending laterally from the body so that multiple hanging items may hang from a single bracket. In other words, although the illustrated embodiment depicts a bracket suitable for hanging a single hanging item, it should be understood that the elements described herein may be suitably configured to allow for hanging a plurality of hanging items from a single or common bracket.

Figure 25:
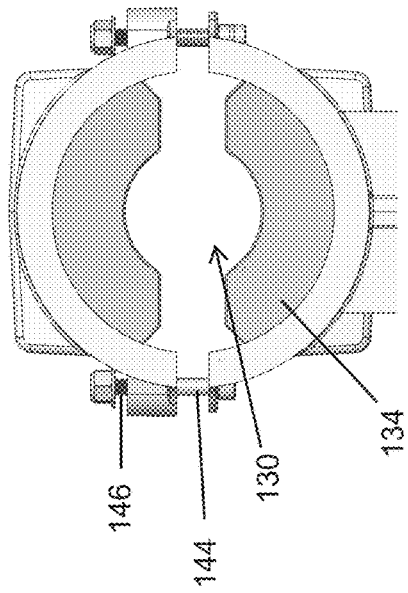
FIG. 25 is an end view of the bracket of FIG. 15, with a different adapter installed along the passageway of the bracket to further reduce the effective diameter of the passageway to accommodate a further reduced diameter pole.
Figure 26:
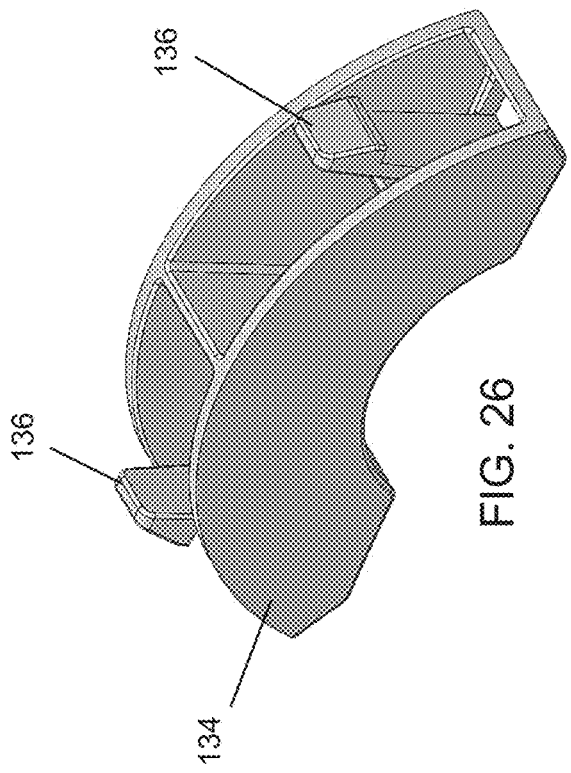
FIG. 26 is a perspective view of the adapter of FIG. 25.
Figure 23:
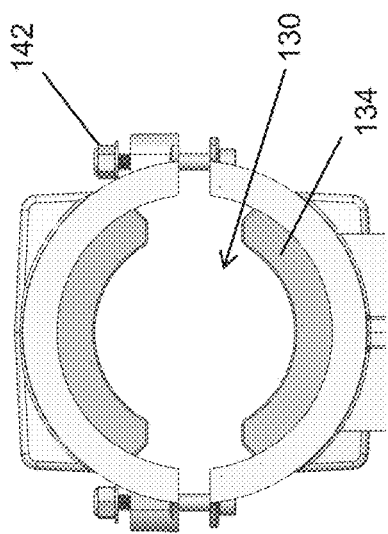
FIG. 23 is an end view of the bracket of FIG. 15, with an adapter installed along the passageway of the bracket to reduce the effective diameter of the passageway to accommodate a reduced diameter pole.
Figure 24:
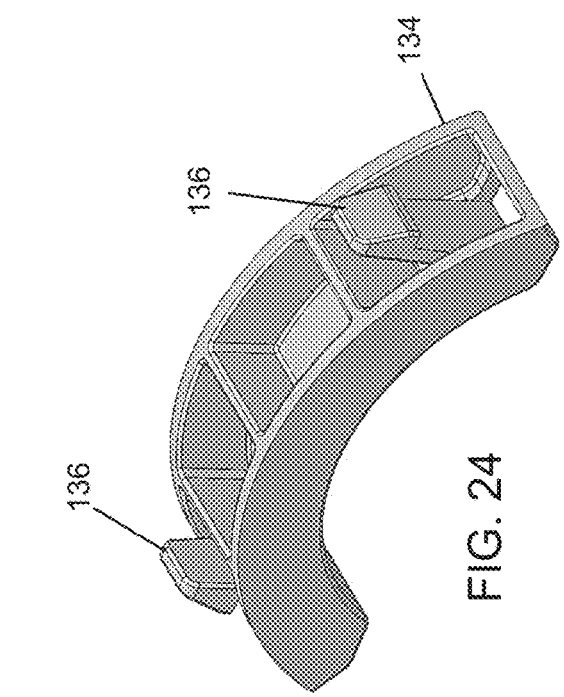
FIG. 24 is a perspective view of the adapter of FIG. 23.

As shown in FIGS. 15-31, a bracket 112 includes a hanging or front portion 114 and a retaining or rear portion 116 that join together to define a passageway 130 for receiving a pole therethrough. The passageway 130 (i.e., the inner surfaces of the hanging and retaining portions of the bracket) is configured to receive one or more inserts or adapters 134 for adapting the inner diameter of the passageway 130 according to the pole at which the bracket 112 is disposed. An adapter 134 may attach (such as snap in place or snap attach) at the inner surface of each portion of the bracket to reduce the effective inner diameter of the passageway and adapt the bracket 112 to use with thinner poles. Optionally, different thicknesses or configurations of adapters may be used for different diameter poles. For example, the bracket 112 without the adapters attached may be able to accommodate up to a four inch diameter pole through the passageway 130, or the adapters 134 may be installed to reduce the diameter of the passageway 130, such as to provide a three inch diameter passageway (FIG. 23) or a two inch diameter passageway (FIG. 25) or any other desired diameter to adapt the bracket for different uses.

The adapters 134 may extend along the length of the bracket 112 or the adapters 134 may be installed only at upper and lower bounds of the passageway 130. For example, and as shown in FIGS. 27-30, the hanging and receiving portions of the bracket 112 may each include snap attachment points or passages 138 for receiving corresponding structure 136 of an adapter 134. The snap tabs 136 of the adapter 134 may be received by the passages 138 of the bracket for retaining the adapter 134 along the passageway 130. While the snap attachment structure may be positioned at any suitable position along the passageway 130, the illustrated embodiment includes respective structure at upper and lower end regions of the passageway 130 so that a respective adapter may be attached at both end regions of both bracket portions.

The respective upper and lower adapters 134 may define different diameters of the passageway 130 to provide the conical passageway described above, or the adapters may define the same diameter to provide a substantially cylindrical passageway. The adapters may include easy glide, friction resistant pads or touch points 140 along an inner surface to reduce friction between the bracket 112 and pole as the bracket 112 is moved into position along the pole. Optionally, the friction resistant pads 140 may be disposed along the inner surface of the hanging portion 114 and the retaining portion 116 of the bracket 112 to provide easier movement of the bracket 112 along the pole without the use of the adapters 134.

Additionally, one or more spring loaded or adjustable fasteners 142 may be used to secure the hanging portion 114 and the retaining portion 116 of the bracket 112 together around the pole to maintain a clamping pressure or force at the pole (via the spring biasing the two portions of the bracket toward one another). Thus, the bracket can be retained at any particular location along the pole via the spring biasing of the bracket portions toward one another (and toward the pole) until a sufficient force is applied at either portion of the rope to overcome the frictional resistance of the bracket at the pole to raise or lower the bracket along the pole. The spring loaded fasteners may include a threaded bolt and nut assembly 144 with a spring 146 disposed along the bolt 144 (e.g., between the bolt head or nut and a flange at one of the portions of the bracket) to provide tension from the bracket against the flag pole.

The spring loaded or adjustable fasteners also provide for adjustment of the bracket at the pole so that, if the diameter of the pole changes along the length of the pole, the two portions of the bracket 112 may expand or retract relative to one another to adjust the diameter of the passageway 130 according to the changing diameter of the pole. For example, the bracket 112 may be installed along a tapered pole (or pole having sections with different diameters, such as a telescoping pole or the like) and the bracket 112 may initially be installed around a wider portion of the tapered pole at an accessible height, with the hanging and retaining portions attached to one another via the spring loaded fasteners 142 and snug to the pole. If the two portions of the bracket 112 are installed at the wider portion of the tapered pole so that the two portions are at least partially distanced from one another (e.g., FIG. 18) when engaging the pole, the two portions will be biased toward engagement by the spring loaded fasteners 142 and will move toward engagement as the bracket is moved along the pole and the diameter of the pole decreases. Similarly, when the bracket 112 is moved back along the pole and the diameter of the pole increases, the two portions of the bracket will move away from engagement with one another and against the biasing force of the spring loaded fasteners 142, while remaining engaged with the pole. In other words, the spring loaded fasteners 142 allow the diameter of the passageway 130 to adjust according to changes in diameter of the pole as the bracket 112 is moved along the pole.

The arm 118 of the bracket 112 may comprise a substantially t-shaped arm (FIG. 31) extending from the outer surface of the hanging portion 114 of the bracket 112 where the t-shape is defined by a vertical portion 118a and a horizontal portion 118b of the arm 118. In the illustrated embodiment, the vertical portion 118a includes a substantially planar body parallel with the longitudinal axis of the passageway 130 and extending radially from the hanging portion 114 of the bracket 112. The horizontal portion 118b includes a substantially planar body perpendicular to the longitudinal axis of the passageway 130 and extending radially from the hanging portion of the bracket 112 and along a length of the vertical portion 118a, where the horizontal portion 118b provides enhanced rigidity and resists flexing of the arm responsive to horizontal forces at the arm 118, such as from the hanging element swaying in the wind when suspended from the bracket 112. Support elements, such as cross members, may extend between the horizontal portion 118b and a lip or upper edge of the vertical portion 118a and along both surfaces of the vertical portion 118a. Part of the vertical portion 118a may extend below the horizontal portion 118b.

Figure 16:
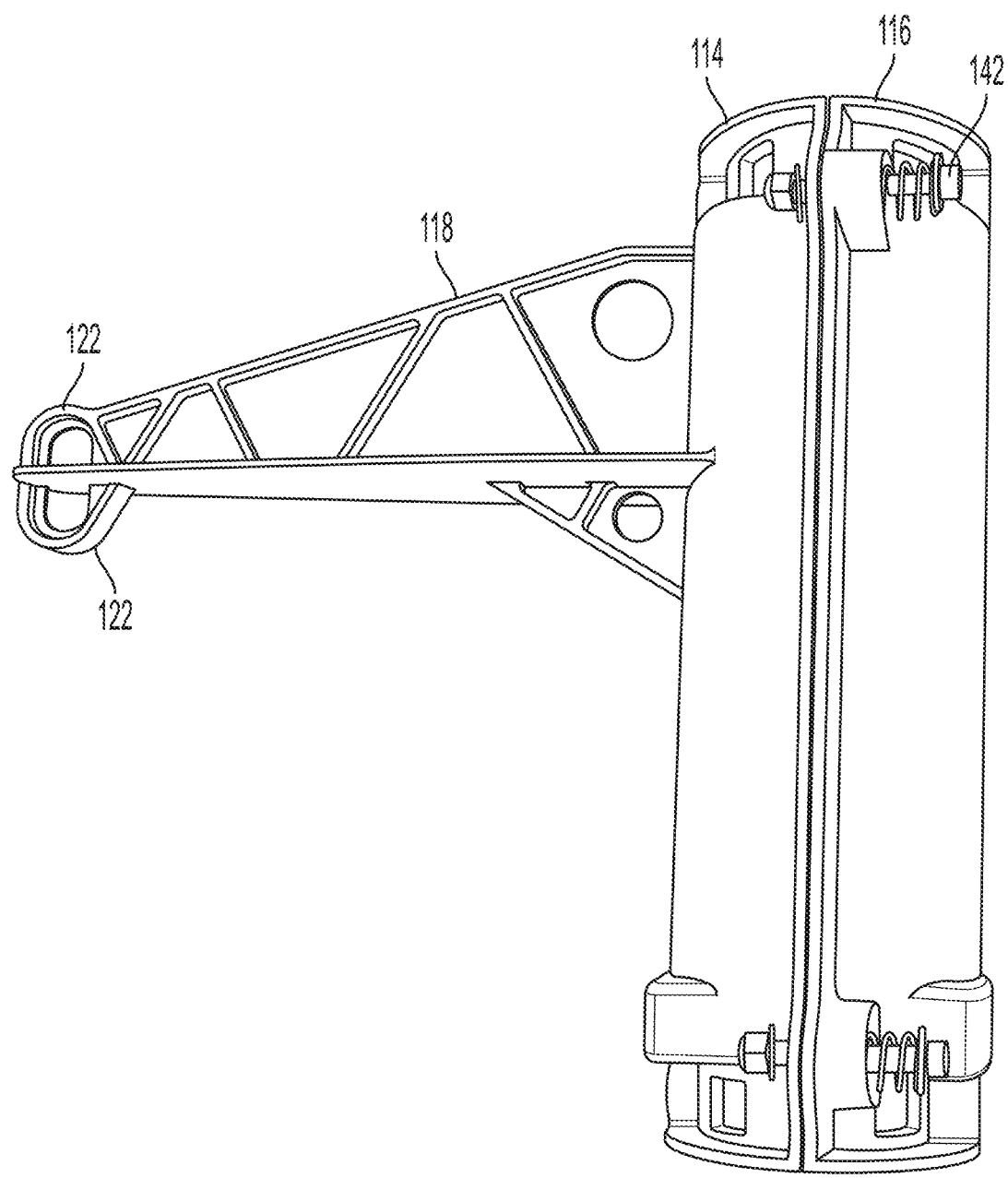
FIG. 16 is another perspective view of the bracket of FIG. 15.
Figure 18:
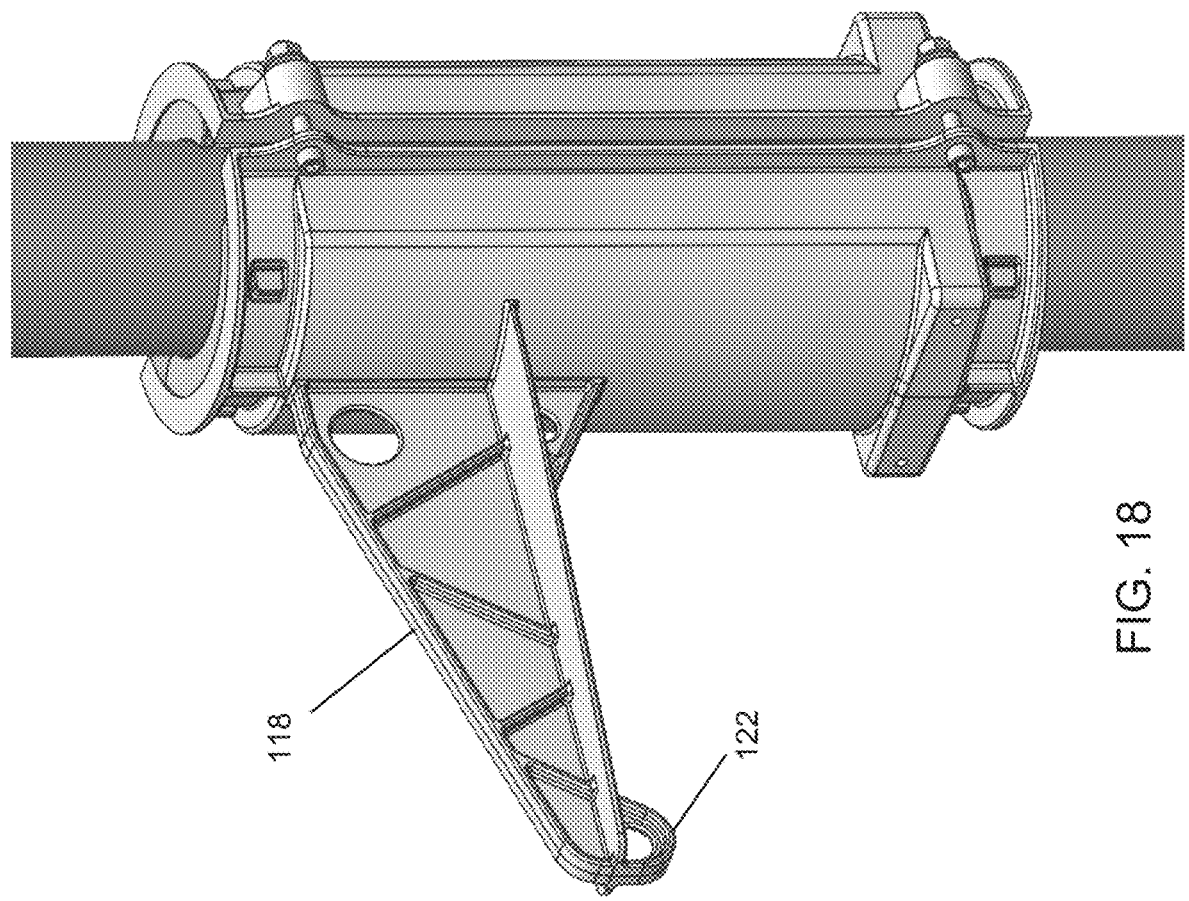
FIGS. 17 and 18 are perspective views of the bracket of FIG. 15 disposed along a pole.
Figure 17:
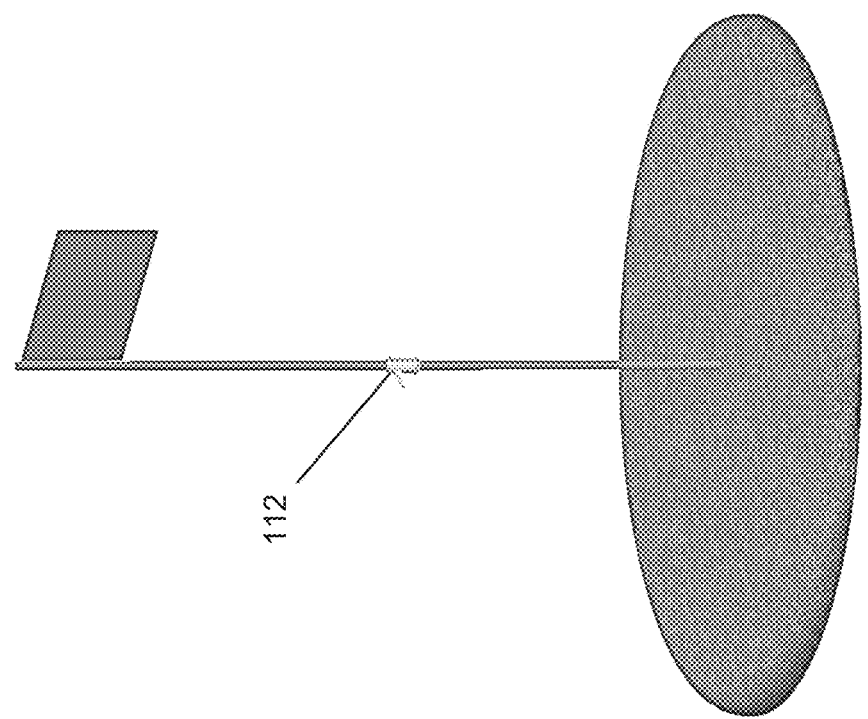
Figure 20:
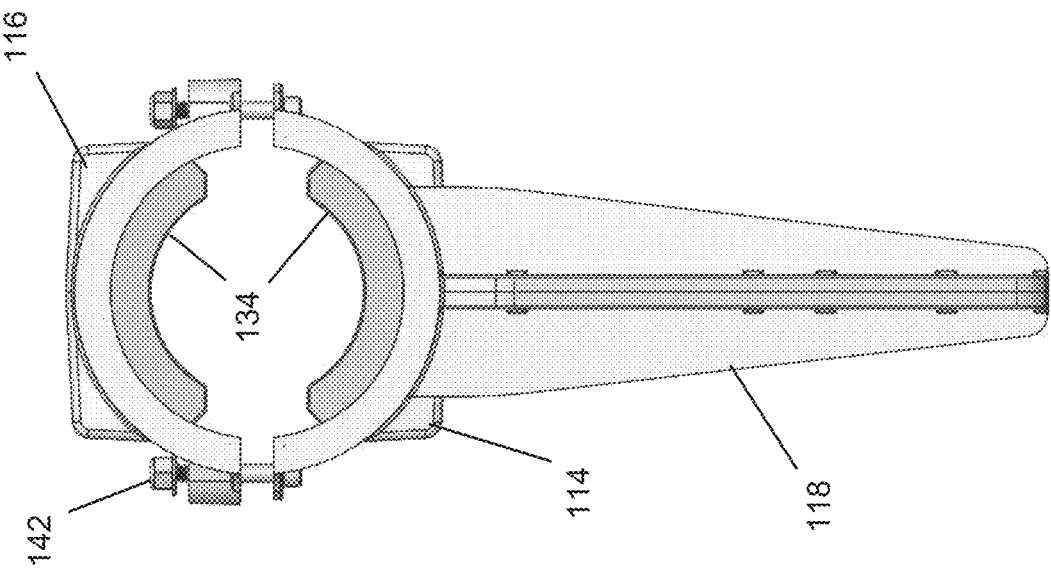
FIGS. 19-22 are additional views of the bracket of FIG. 15.
Figure 19:
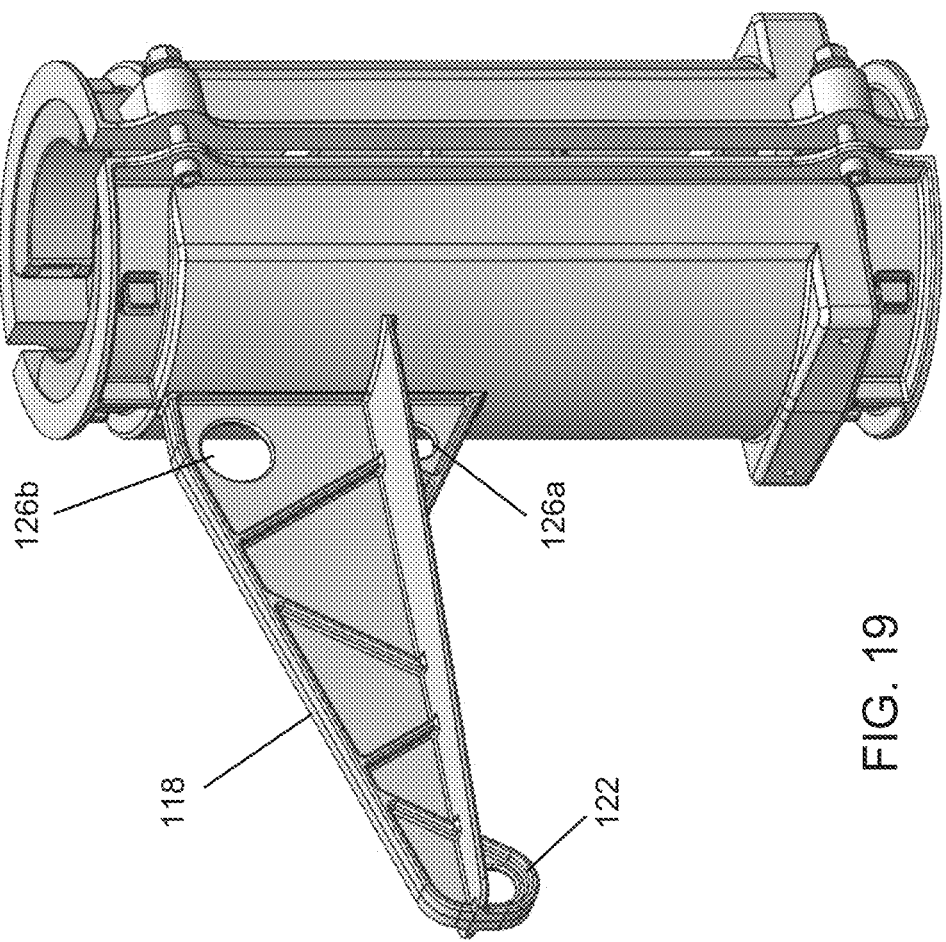
Figure 22:
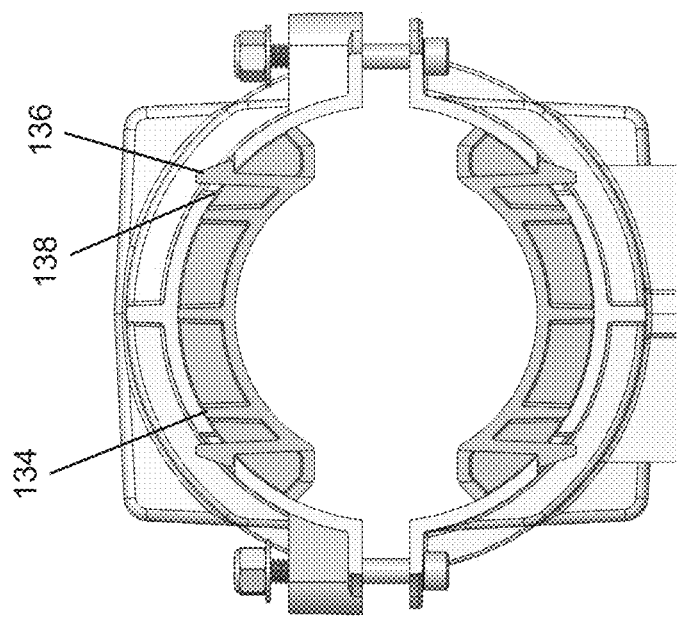
Figure 21:
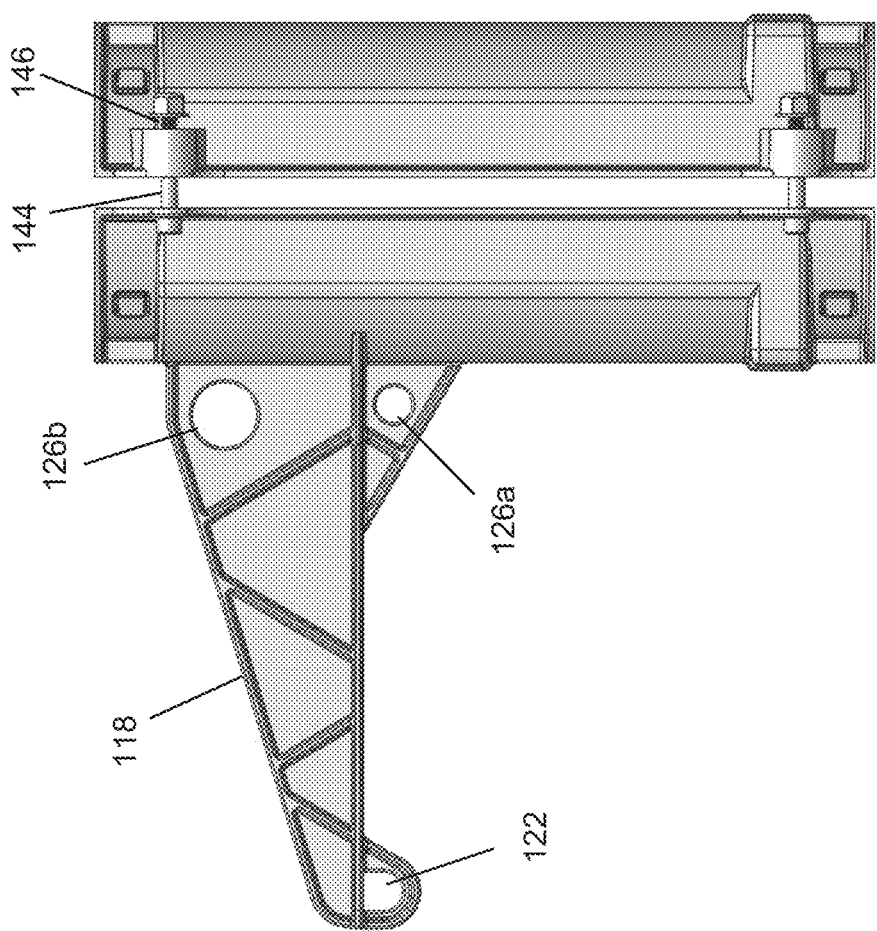

As shown for example in FIGS. 16 and 18, the hanging element 122 at the end of the arm 118 may include one or more hanger loops for receiving a hanger or clip of the hanging item. That is, the arm 118 may include a loop or through hole 122 at any position along the arm 118 (such as at an underneath surface of the arm, an upper surface of the arm, through a body of the arm, or the like) to receive a hanging item or a clip connecting the hanging item to the bracket 112.

Further, the arm 118 may include a first connecting element 126a and a second connecting element 126b for connecting the bracket 112 to the rope and pulley system of the pole. The first and second connecting elements may comprise through holes or loops (for receiving clips or carabineers or the like attached to the ends of the rope or for receiving the rope directly). For example, the first connecting element 126a may be formed through the vertical portion 118a of the arm 118 below the horizontal portion 118b and the second connecting element 126b may be formed through the vertical portion 118a of the arm 118 above the horizontal portion 118b. Similar to the distal through hole 26b discussed above, the connecting element 126b receives a distal end of the rope from the rope and pulley system (either via a connecting element such as a clip or directly receiving the end of the rope) for raising and lowering the bracket 112 along the length of the pole. The length of the rope may pass along the length of the pole, wrap around a pulley at an upper end of the pole, and return to attach to the second connecting element 126b. The length of the rope may pass along the outside of the bracket 112. Optionally, and as described further below, the length of the rope may pass through a passageway formed in the body of the bracket or the arm of the bracket.

When the bracket is not being moved along the pole, the load of the hanging item at the hanging element 122 may bias at least a portion of the inner surface of the passageway 130 (such as the pads 140) into engagement with the pole and the bracket is precluded or restricted from moving along the pole. For example, with a cylindrical passageway, the biasing force of the hanging item pulls an upper end of the bracket downward, thus altering or pulling the axis of the passageway 130 out of alignment with the pole and fixing the bracket at the position along the pole. When a force is applied at the end of the rope to move the bracket along the pole, the upward pull of the rope at the connecting element 126b aligns the passageway 130 of the bracket with the pole and the force overcomes any frictional resistance provided by the pole to move the bracket upward. The frictional resistant pads 140 may reduce the friction between the pole and inner surface of the passageway to ease movement of the bracket along the pole. The force may be similarly applied to align the axis of the passageway and pole and then released to lower the bracket along the pole.

Optionally, the inner surface of the passageway of the bracket may maintain an engagement with the pole, such as via the clamping force applied by the spring biased fasteners, so that, when no external force is applied to the rope, the frictional force between the inner surface of the passageway and the pole causes the bracket to maintain its position along the pole. When an external force is applied to the rope to move the bracket, the external force overcomes the frictional force and the position of the bracket is adjusted along the pole.

Figure 33:
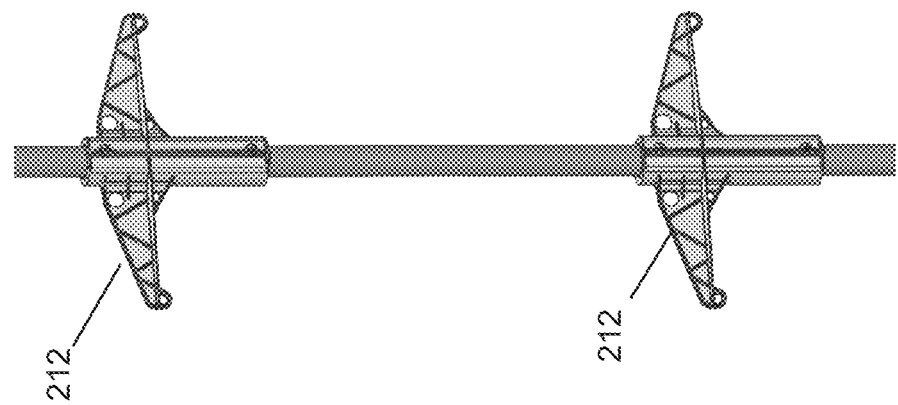
FIGS. 32-34 are perspective views of another bracket disposed along a pole, where both portions of the bracket include an arm for hanging elements from the bracket.
Figure 32:
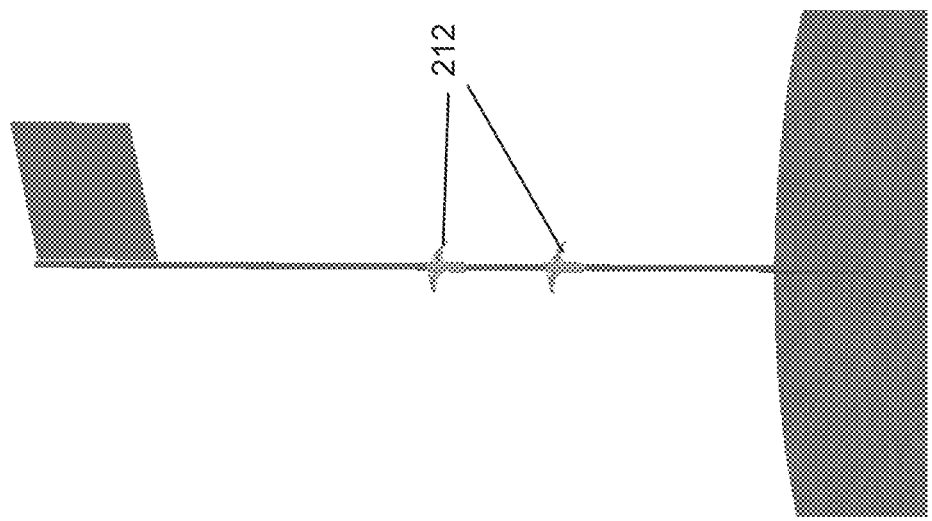
Figure 35:
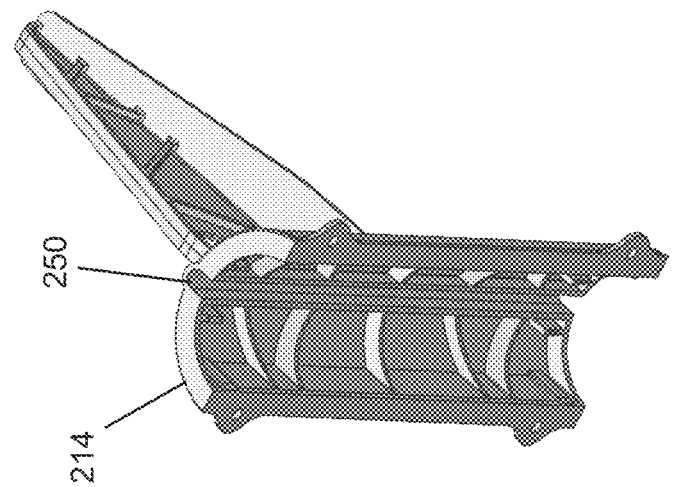
FIGS. 35 and 36 are perspective views of the hanging portion of the bracket of FIGS. 32-34.
Figure 34:
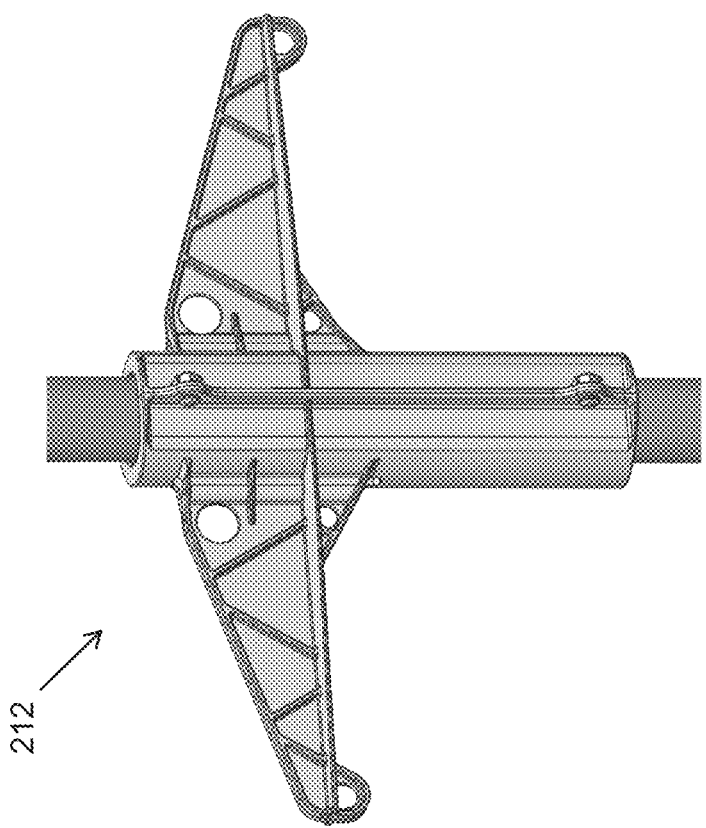
Figure 37:
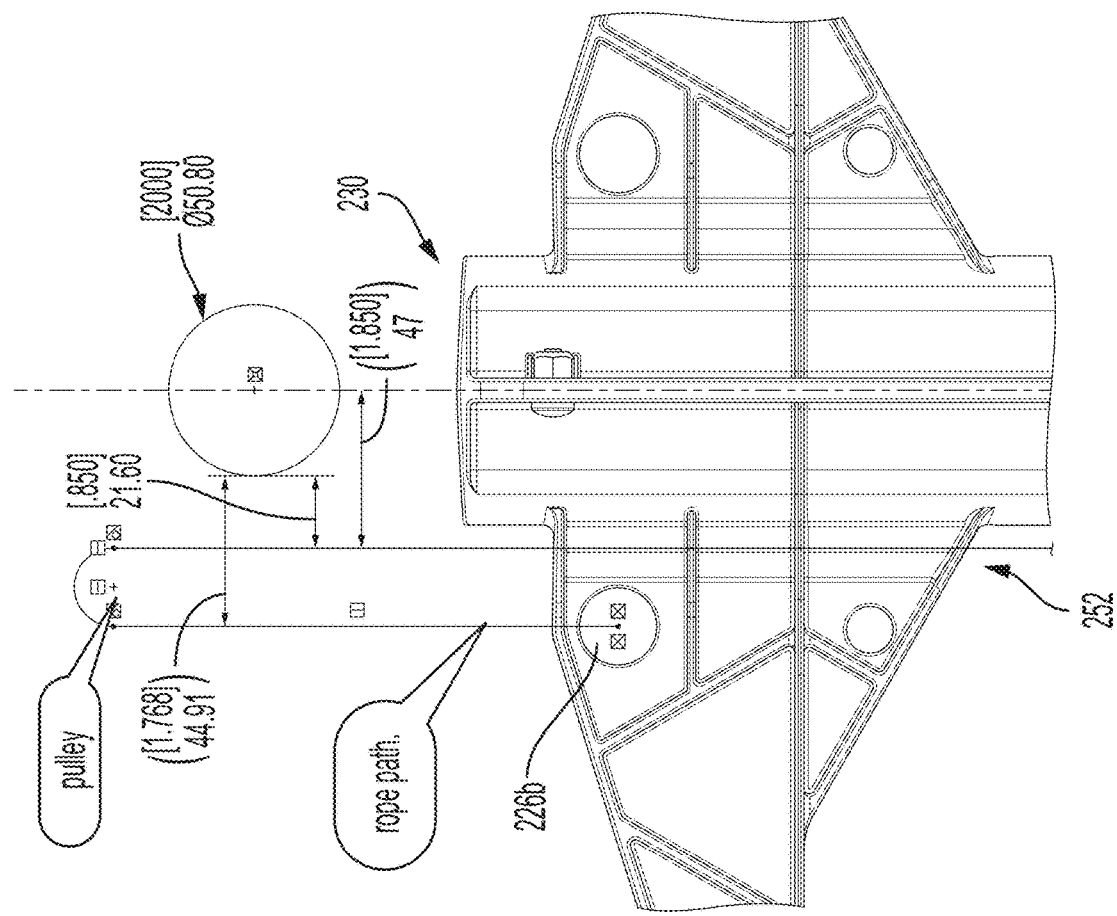
FIG. 37 is a side view of the bracket of FIGS. 32-34, showing a rope extending through a channel of the bracket.
Figure 36:
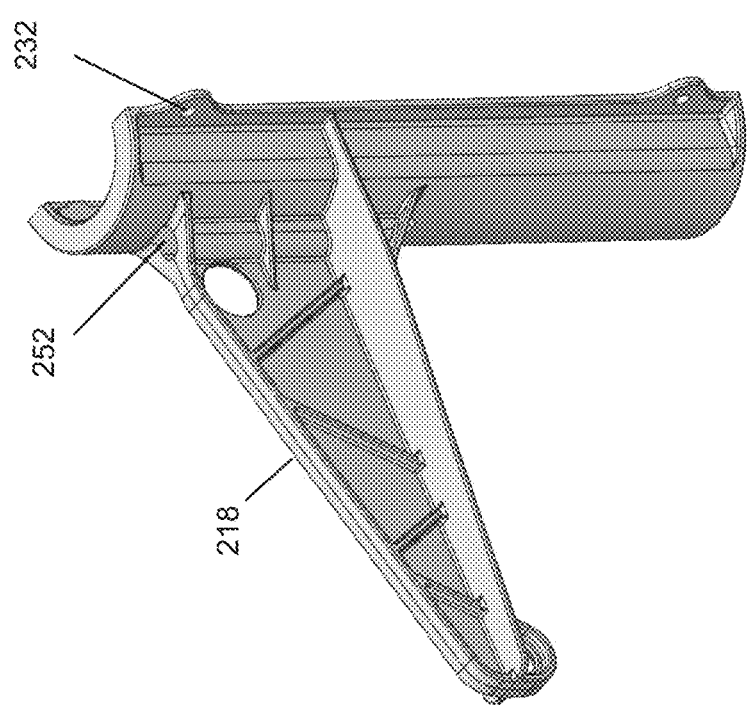
Figure 38:
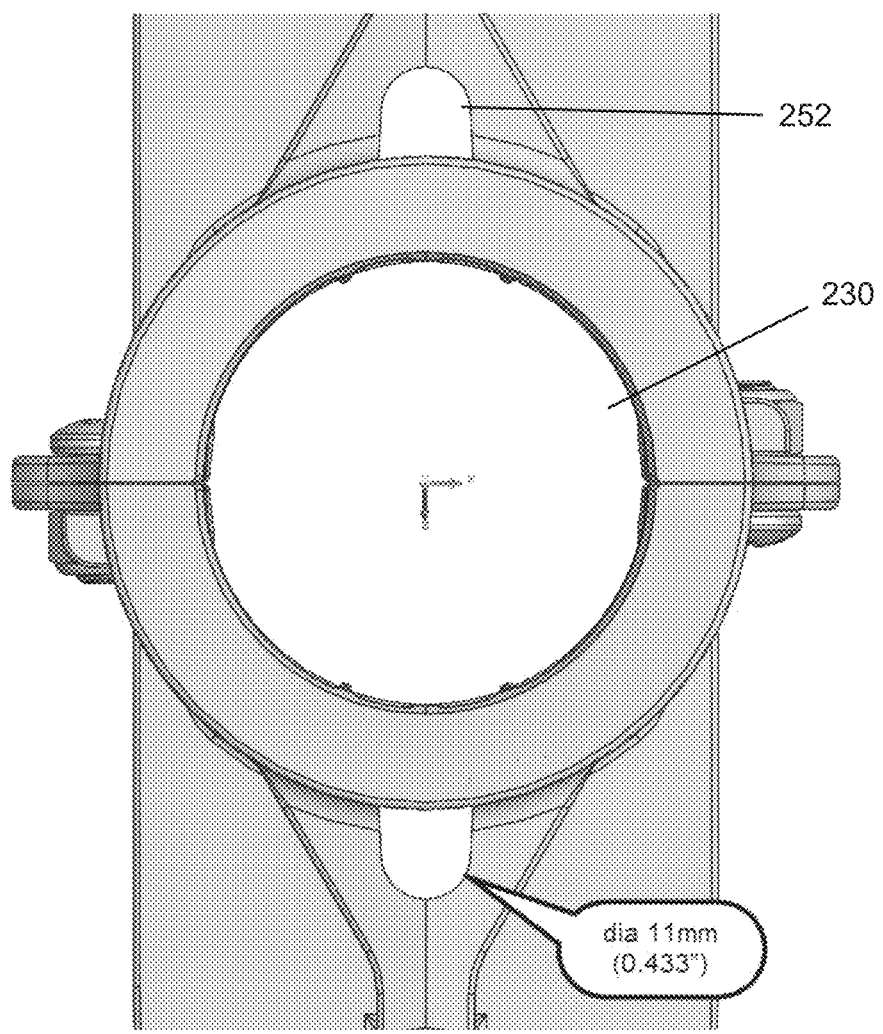
FIG. 38 is an end view of the bracket of FIGS. 32-34.

Optionally, the first connecting element 126a may receive a connecting rope (i.e., the distal end of a rope or a connecting element at the distal end of the rope) for connecting a second bracket 112 along the length of the pole. Thus, the connecting rope may attach to the first connecting element 126a of an upper bracket and the second connecting element 126b of a lower bracket below the upper bracket along the length of the pole (see FIGS. 32 and 33) so that, when the upper bracket is raised or lowered via the rope and pulley system, the lower bracket raises and lowers along the length of the pole together and in tandem with the upper bracket.

Figure 28:
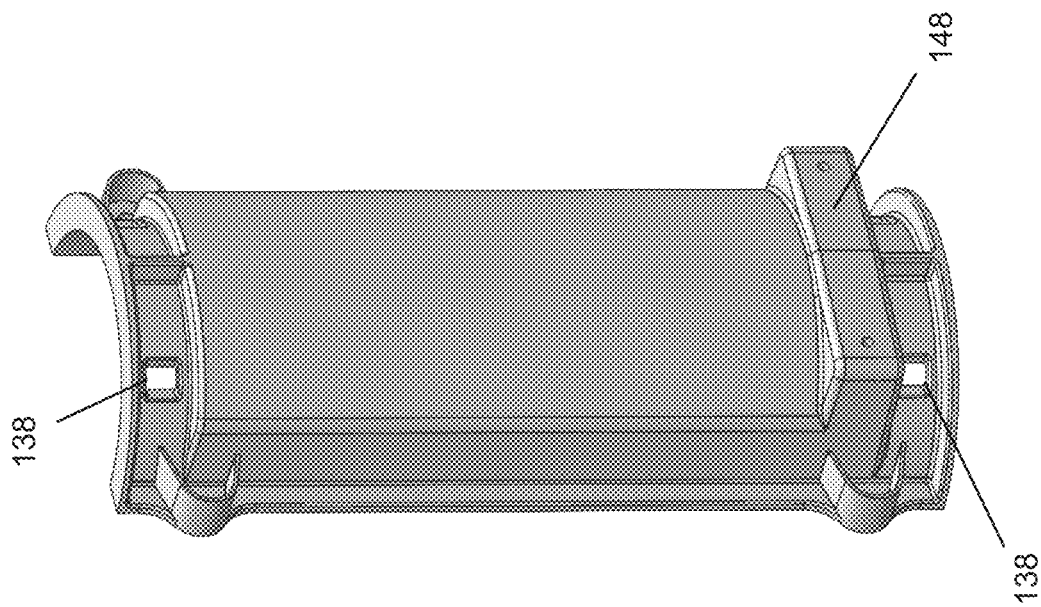
FIGS. 27 and 28 are perspective views of the retaining portion of the bracket of FIG. 15.
Figure 27:
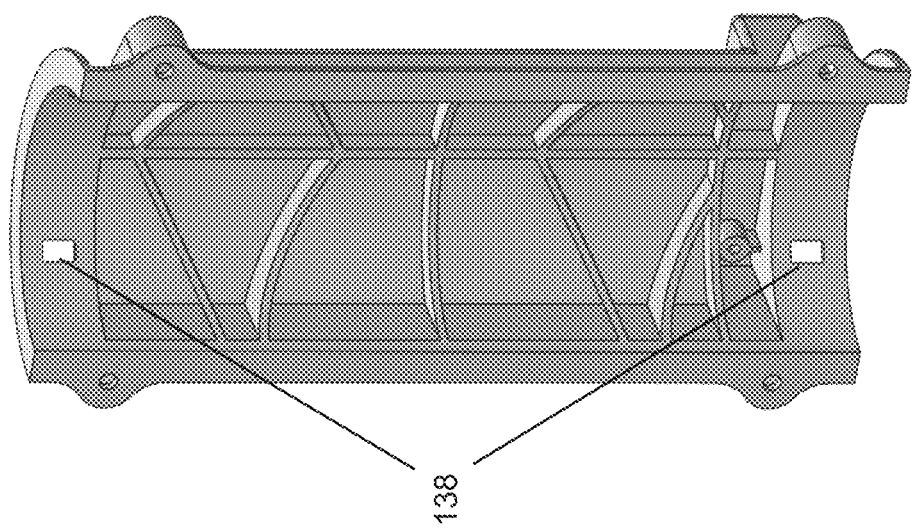
Figure 30:
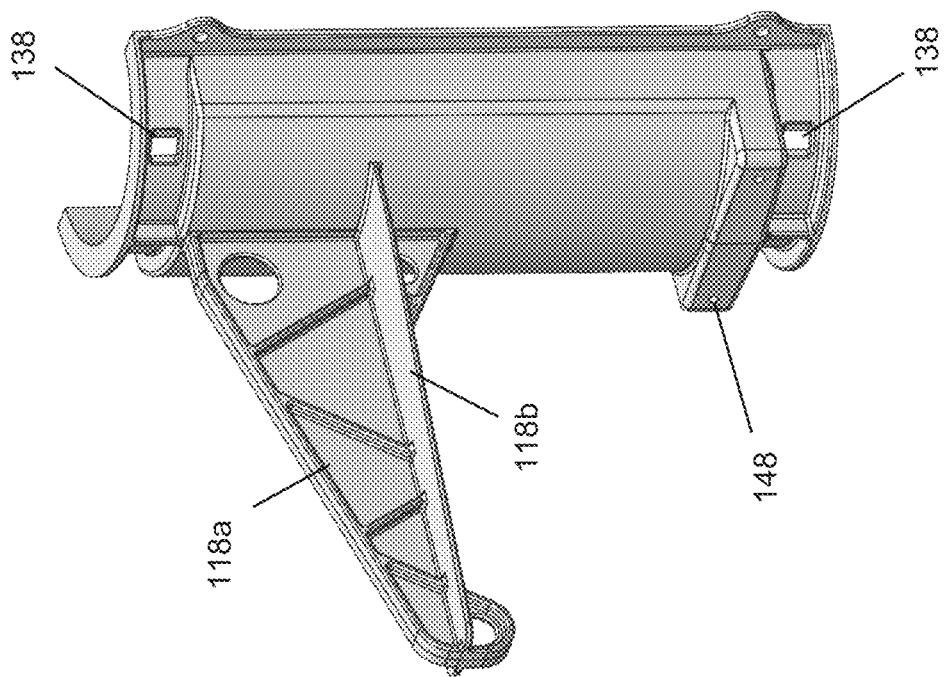
FIGS. 29-31 are views of the hanging portion of the bracket of FIG. 15.
Figure 29:
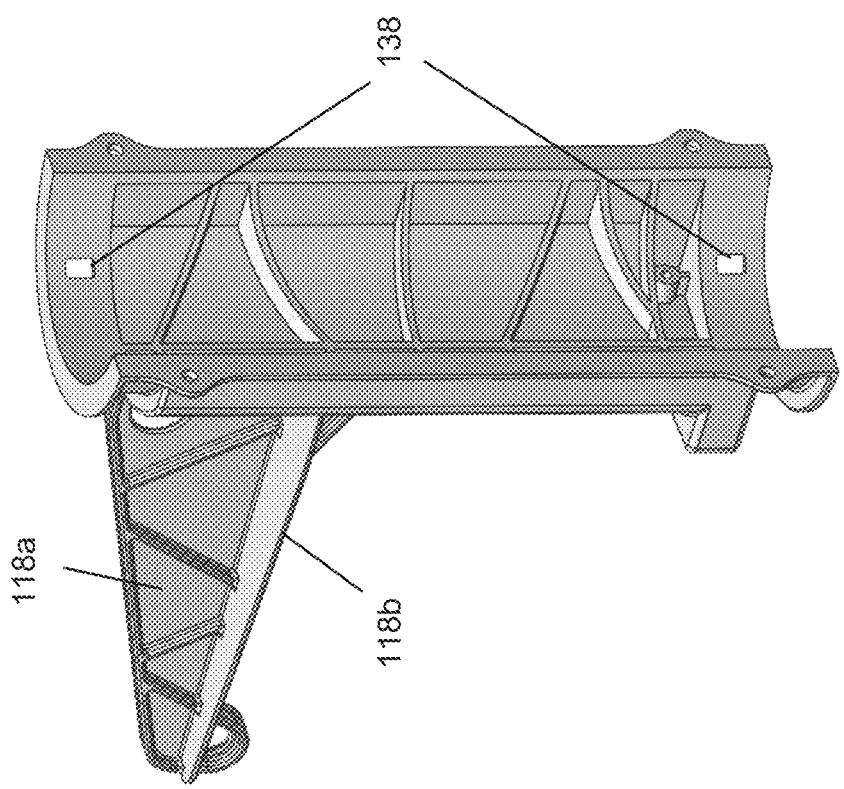
Figure 31:
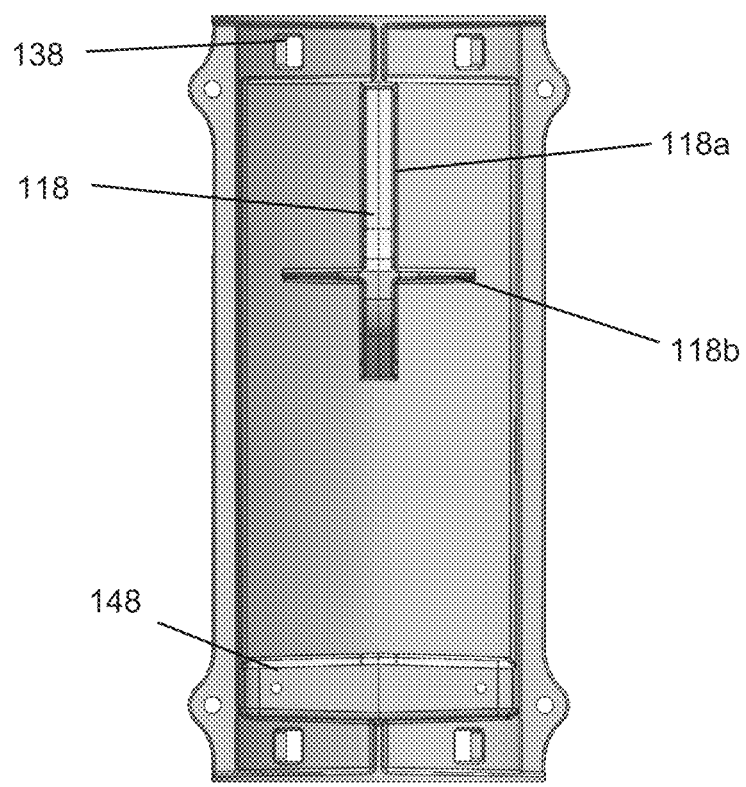

As shown in FIGS. 28 and 30, both the hanging portion 114 and the retaining portion 116 of the bracket 112 may each include an accessory attachment portion 148, such as a flat outer surface or screw boss for receiving one or more accessories at the bracket 112. For example, a lighting system, additional hanging elements, a decorative cover, or any other suitable accessory may attach at the accessory attachment portion 148 to be disposed at or hang from the bracket 112.

Optionally, and such as shown in FIGS. 32-41, a bracket 212 may include a rope passageway or rope retaining element for receiving the length of the rope therethrough and securing the length of rope relative to the bracket. The rope passageway may include a channel 250 (FIG. 35) formed through the body of the bracket 212 such that the rope extends along an inner surface of the passageway 230 along either the hanging portion 214 or the retaining portion of the bracket 212 and parallel to the longitudinal axis of the passageway 230. Optionally, the rope passageway may include a channel 252 (FIGS. 36-38) formed through the arm 218 and parallel to the passageway 230 so that the channel 252 is further outboard than the channel 250, allowing the base to continue to have structure to prevent flexing of the bracket. The channel may comprise a U-shaped channel, providing clearance to the rope as it passes along and through the channel and having any suitable diameter, such as, for example, 11 mm. By passing the length of the rope along the rope passageway (instead of, for example, passing the rope along the outside of the bracket), the rope is stabilized relative to the bracket and the bracket is precluded from being blown around by the wind. For example, stabilizing the rope reduces inadvertent forces that may be applied to the rope and thus reduces the chances of the bracket moving unintentionally along the pole (such as if an inadvertent force were to align the axis of the passageway with the pole and the bracket were to move downward along the pole). This also maintains viewability of the hanging items so that when the desired height is set, the bracket will remain in its position without spinning around the pole. Furthermore, with the channel formed through the body or the arm of the bracket, the rope passes along the length of the body of the bracket and inboard of the hanging item attached at the distal ends of the arms. Thus, the rope may more freely move along the length of the pole without interfering with the hanging item or being interfered with by the hanging item.

Thus, a first portion of the rope may pass through the channel and a second portion of the rope (such as an end portion of the rope) may attach at the connecting element 226b formed through the arm 218. For example, the rope may extend through the channel 252 toward the top of the pole, wrap around a pulley at or near the upper end of the pole, and an end of the rope may attach to the connecting element 226b (such as via a knot tied to the connecting element or via attachment of a clip or carabineer at the end of the rope to the connecting element). Similarly, a second pulley may be disposed at or near the lower end of the pole and the first portion of the rope may pass from the pulley at the upper end of the pole, through the channel of the bracket, and wrap around the pulley at the lower end of the pole where a second end of the rope may extend upward from the pulley at the lower end of the pole to connect at the bracket. Thus, a downward force at the portion of the rope between the upper and lower pulleys may overcome frictional forces to raise the bracket along the pole and a downward force at the portion of the rope between the lower pulley and the bracket may overcome frictional forces to lower the bracket along the pole.

Optionally, the pole may include only a pulley at or near the upper end of the pole and the second end of the rope may be fixed at or near the lower end of the pole (e.g., wrapped around a cleat at the pole) to retain an axial position of the bracket along the pole. That is, with the second end of the rope fixed, tension along the rope may maintain the vertical position of the bracket along the pole where the frictional force caused by the bracket engaging the pole may maintain a rotational position of the bracket along the pole (i.e., the bracket will not spin due to, for example, wind). When the second end of the rope is pulled downward along the pole, the force overcomes the frictional force between the bracket and the pole and the bracket moves upward along the pole. When the second end of the rope is released and allowed to move upward along the pole, gravitational force at the bracket (such as due to the weight of the bracket and/or load of the hanging item) may overcome the frictional force and the bracket moves downward along the pole.

Optionally, the bracket may have a releasing mechanism to release or reduce the clamping force applied by the spring biased fasteners and therefore reduce the frictional force between the passageway and the pole so that gravity overcomes the frictional force and the bracket lowers along the pole.

Figure 41:
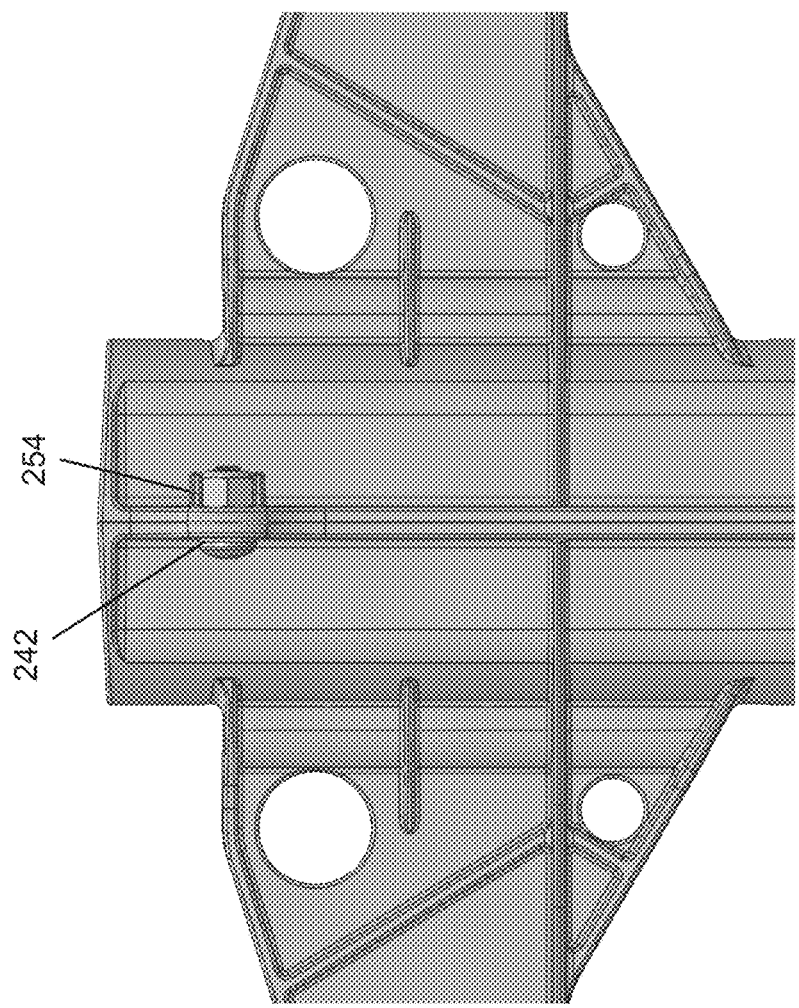
FIGS. 39-41 are views of the bracket of FIGS. 32-34, showing a fastener securing two portions of the bracket together.
Figure 39:
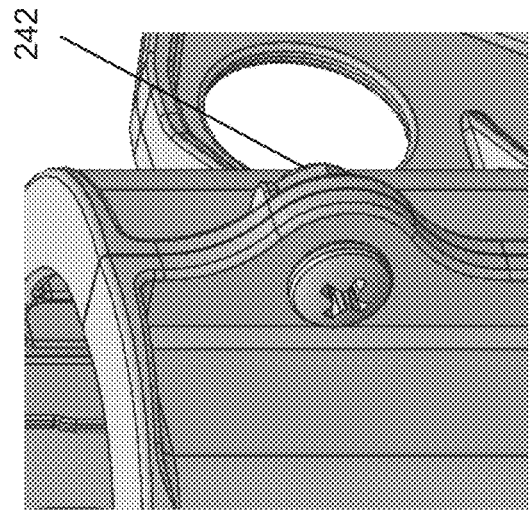
Figure 40:
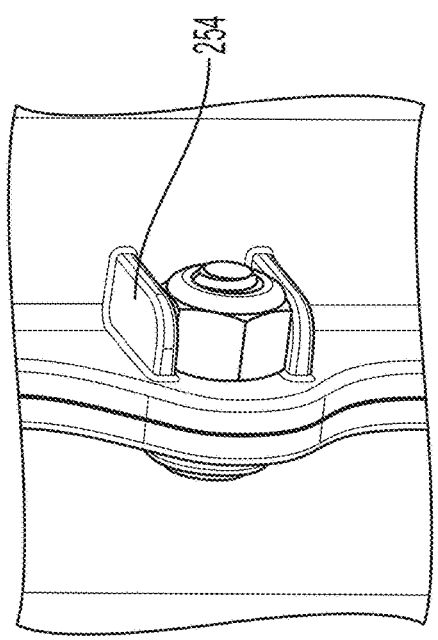

Optionally, and such as shown in FIGS. 39-41, at least one portion of the bracket 212 may include guide elements or ribs 254 arranged proximate the through holes 232 that receive the fasteners 242. The guide elements 254 are configured to align with the planar surfaces of a nut of the fastener 242 to hold the nut in place while a user tightens the fastener to the nut. Thus, the guide elements 254 may allow the user to tighten the fastener using only a single hand. Further, the guide elements 254 are designed in a way that only a common household Phillips screwdriver (or other driver, such as a square-head driver or star driver or Allen wrench or socket driver, depending on the head of the fastener or bolt being used) is needed to assemble the bracket. The guide ribs act as a socket (and optionally may be in the shape of a hexagon) and keep the nut from spinning while the screw/bolt is being turned into place, fastening the two portions of the bracket 212 together. Optionally, the placement of these guide elements may be configured for a right handed individual to hold the screwdriver in their right hand while assembling the bracket.

Figure 42:
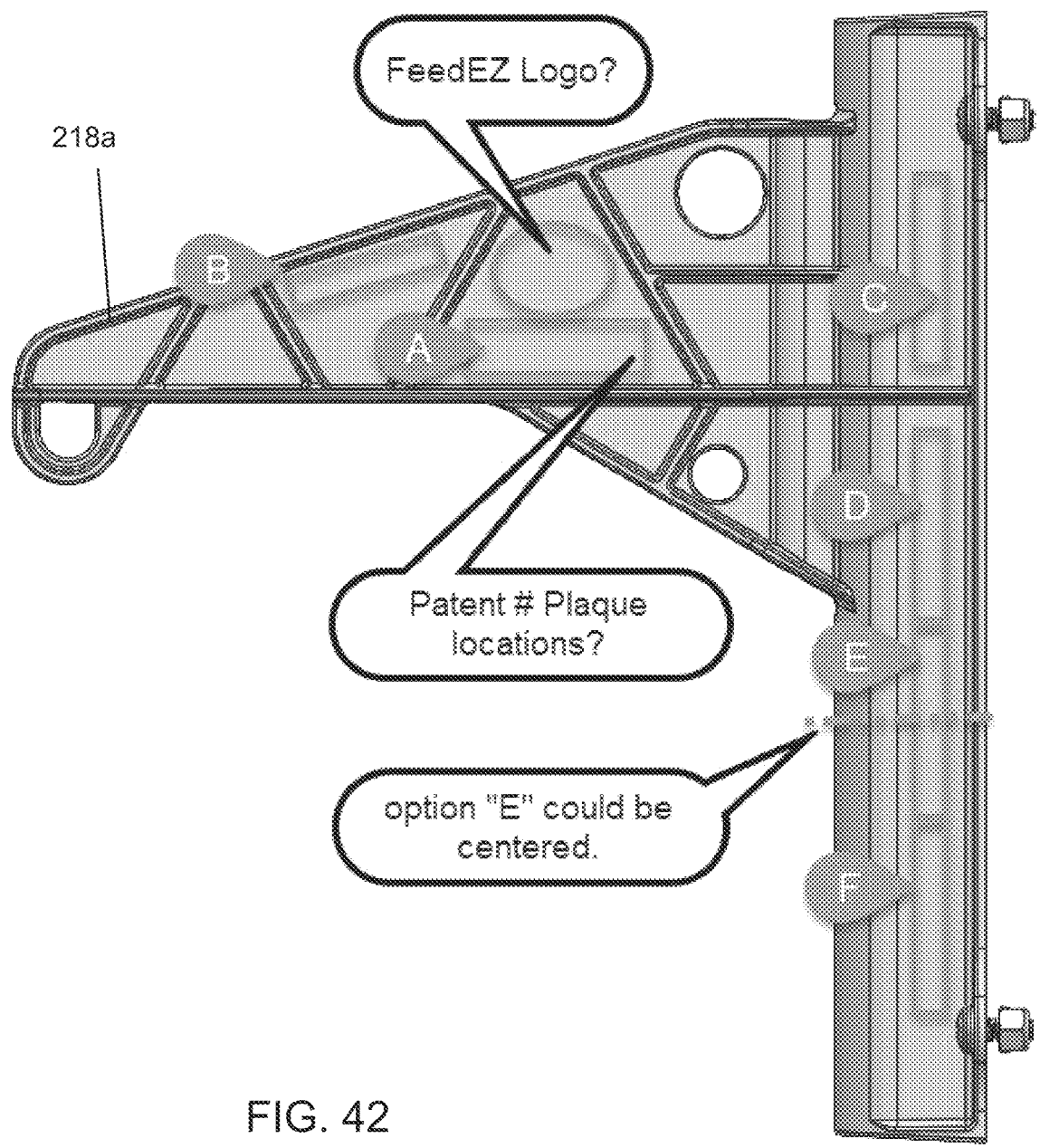
FIG. 42 is a side view of the bracket showing optional locations for placement of product information.

As shown in FIG. 42, work marks or logos, such as to indicate the manufacturer or patent number associated with the product, may be positioned at any suitable external surface of the bracket, such as at a surface of the vertical portion 218a of the arm 218.

Figure 43:
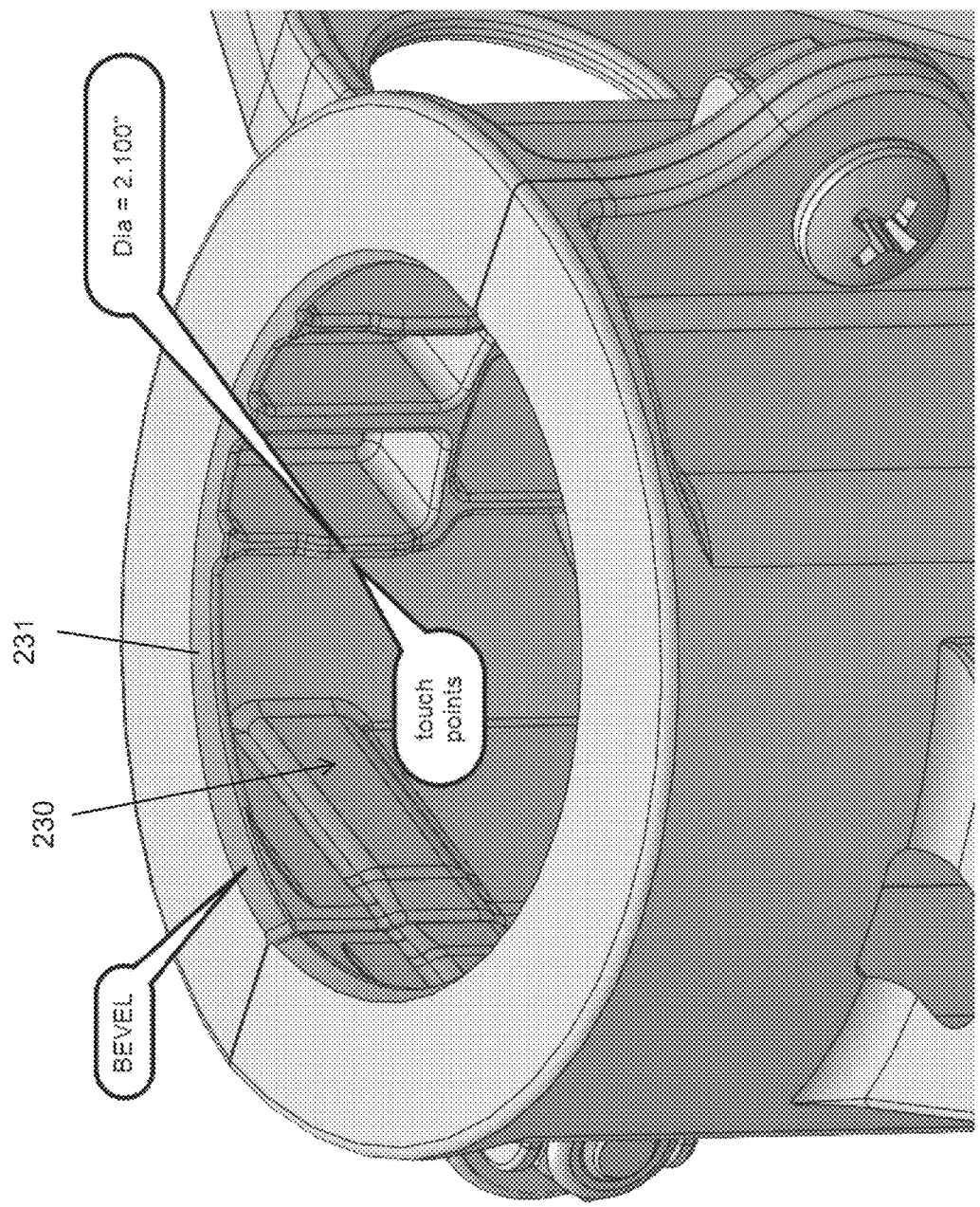
FIG. 43 is a perspective view of an end portion of the bracket, showing a bevel at an end of the passageway and touchpoints at an inner surface of the passageway.
Figure 46:
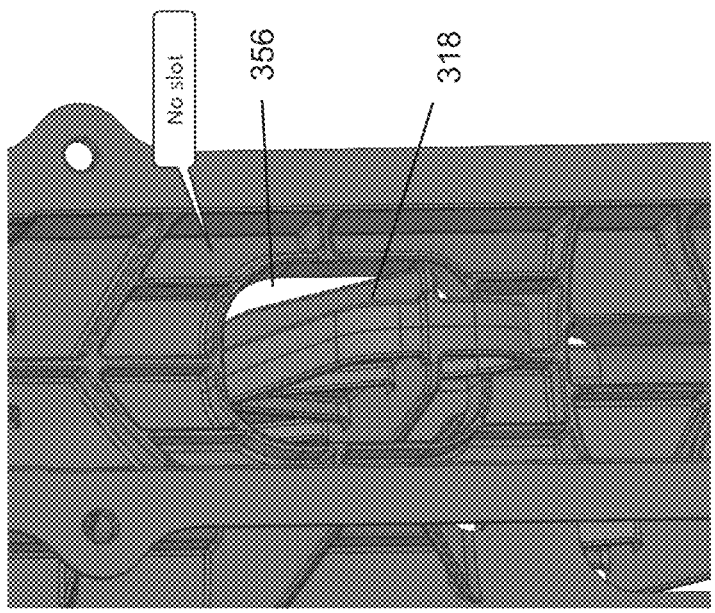
FIGS. 44-48 are views of the bracket having windows formed through the respective portions of the bracket so that, when packaged, the arms of the two portions of the bracket may pass through the respective window of the other portion of the bracket to reduce a packaging footprint of the bracket.
Figure 45:
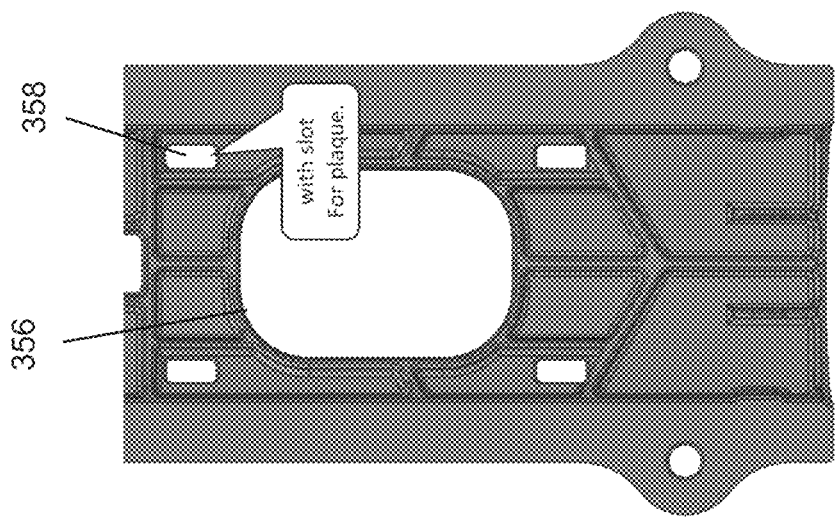
Figure 44:
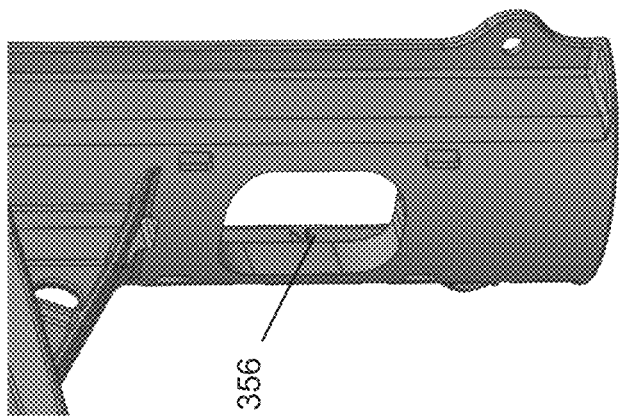
Figure 48:
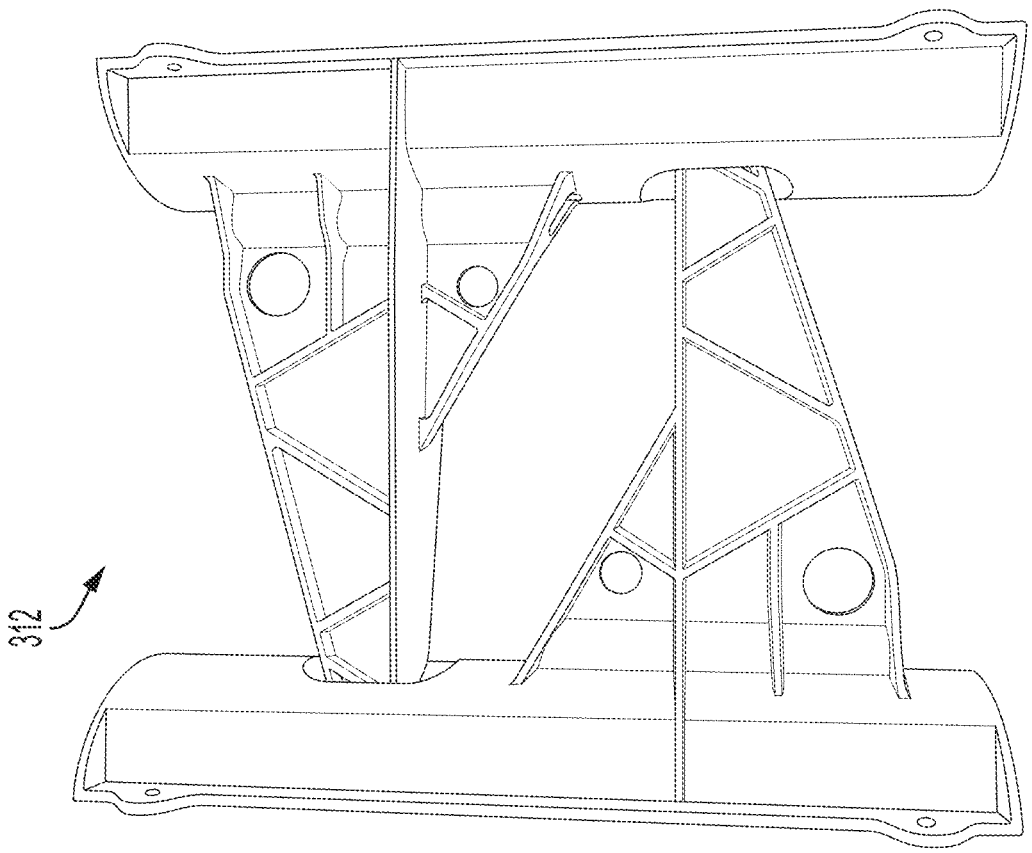
Figure 47:
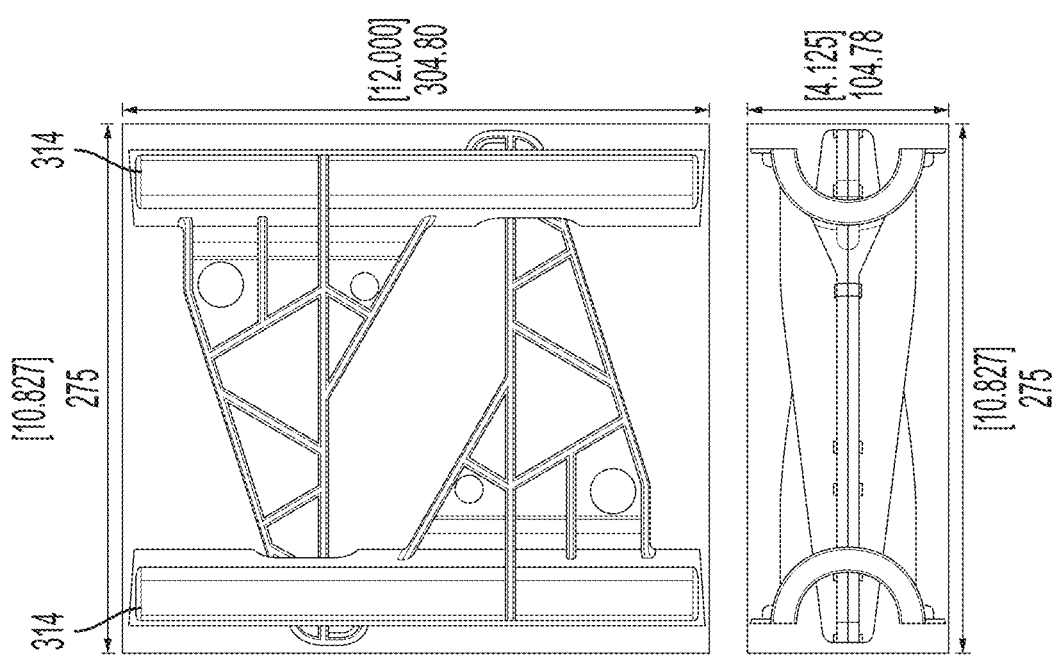
Figure 49:
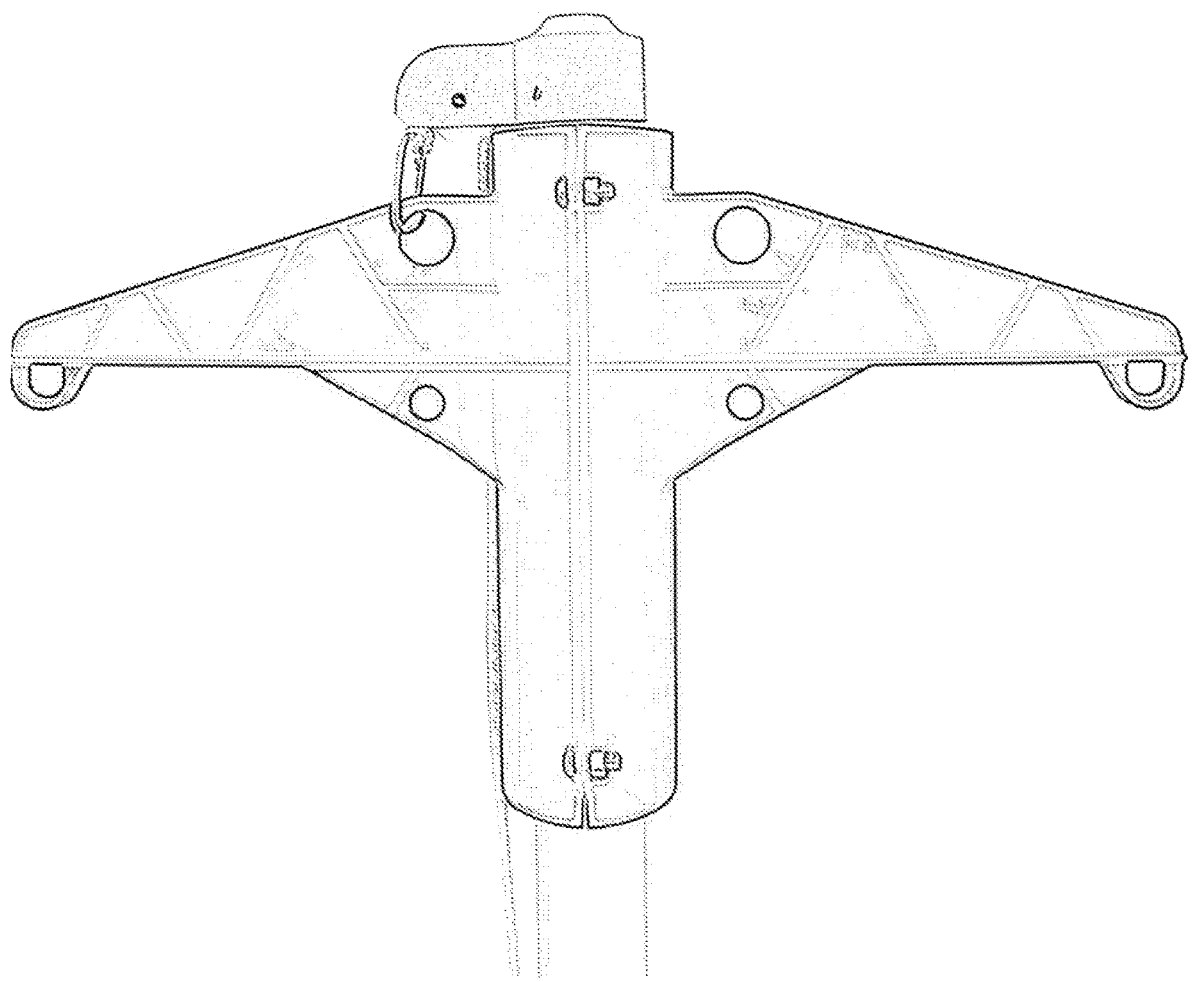
FIGS. 49 and 50 are perspective views of the bracket disposed along a pole.
Figure 50:
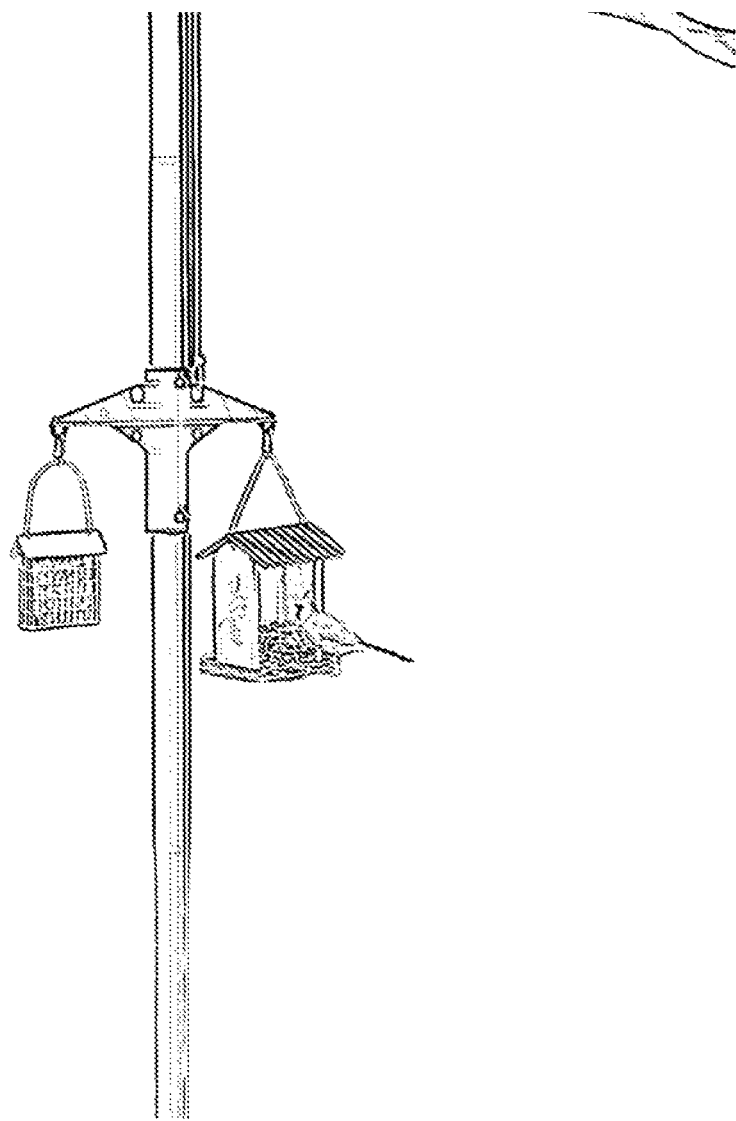

As shown in FIG. 43, the upper and lower ends of the bracket portions 214 surrounding the passageway 230 may include a bevel 231 (i.e., the upper and lower edges of the bracket portions defining the passageway may be beveled) to reduce friction when moving the bracket along the pole. As also shown in FIG. 43, the inner part or structure of the bracket may include protrusions or touch points that are configured to engage the pole to reduce the surface area contact of the bracket with the pole to reduce friction and ease movement of the bracket along the pole when setting the position/height of the bracket along the pole.

Furthermore, the bracket 212 may include two hanging portions 214 (see FIG. 34) that engage one another around the pole to define the passageway 230. In other words, both portions of the bracket may include arms 218 for hanging items from the bracket on opposite sides of the pole. However, when both portions include arms, this increases the packaging footprint. To reduce the packaging footprint, the body of each portion of the bracket may include a window or passageway so that, when the two portions of the bracket are packaged together, the arms may each pass through the window of the other portion of the bracket.

For example, and as shown in FIGS. 44-50, a bracket 312 includes an aperture or window 356 formed through the body of each portion 314 of the bracket 312 so that, when two portions 314 having arms 318 are packaged together, at least a portion of each arm 318 may be received through the window 356 of the other portion 314. Optionally, slots or attaching elements 358 may be formed at the inner surface (i.e., along the passageway) of the portion 314 of the bracket so that a cover for the window 356 may be attached prior to installation of the bracket 312 along the pole.

Thus, the hanging system allows a hanging item to be adjustably positioned at a desired position along the length of a pole via adjustment of a rope relative to the pole. For example, the hanging system may be installed at an already existing flagpole and utilize the raising assembly of the flagpole to adjust the position of the hanging system along the flagpole. The hanging system includes a bracket that is (i) configured to receive the pole therethrough, (ii) configured to retain the hanging item at a distance from the pole, and (iii) is adjustable along the length of the pole via adjustment of a rope. The design allows for easy setup and installation and allows hanging items, such as bird feeders or flower baskets or spotlights or the like, to be readily positioned at otherwise unreachable heights.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:
1. A hanging system, the hanging system comprising:
a bracket configured to adjustably mount at a pole;
a rope extending through a pulley at or near an upper end of the pole;
wherein the bracket comprises (i) a body defining a passageway along a length of the body, and (ii) an arm extending laterally from the body and including a hanging element along the arm and spaced from the body;

wherein the bracket, when adjustably mounted at the pole, receives the pole along the passageway;

wherein, when the bracket is adjustably mounted at the pole, a first end of the rope is connected at a connecting element of the bracket and a length of the rope extends from the first end in an upward direction along the pole and through the pulley at or near the upper end of the pole, and wherein a first portion of the length of the rope extends from the pulley at or near the upper end of the pole and in a downward direction along the pole, and wherein the first portion of the length of the rope extends along the length of the body of the bracket and along a channel formed along the bracket and parallel to the passageway;

wherein, when the bracket is adjustably mounted at the pole and with no external force applied at the rope, an inner surface of the body along the passageway engages the pole to, at least in part due to a frictional force between the bracket and the pole, retain the bracket at a position along the pole; and wherein, when the bracket is adjustably mounted at the pole and responsive to an external force applied at the first portion of the length of the rope in the downward direction along the pole, the external force overcomes the frictional force and the bracket moves in the upward direction along the pole to adjust the position of the bracket along the pole.

2. The hanging system of claim 1, wherein, when the bracket is adjustably mounted at the pole, a second end of the rope distal from the first end is connected to the bracket and a second portion of the length of the rope extends from the second end in the downward direction along the pole and through a pulley at or near a lower end of the pole, and wherein the first portion of the length of the rope extends between the pulley at or near the upper end of the pole and the pulley at or near the lower end of the pole.

3. The hanging system of claim 2, wherein, when the bracket is adjustably mounted at the pole and responsive to an external force applied at the second portion of the length of the rope in the downward direction along the pole, the external force overcomes the frictional force and the bracket moves in the downward direction along the pole to adjust the position of the bracket along the pole.

4. The hanging system of claim 1, wherein, when the bracket is adjustably mounted at the pole and with no external force applied at the rope, a second end of the rope distal from the first end is fixed at or near a lower end of the pole and tension along the length of the rope retains the bracket at an axial position along the pole, and wherein the inner surface of the body engages the pole to retain the bracket at a rotational position along the pole.

5. The hanging system of claim 4, wherein, when the bracket is adjustably mounted at the pole and responsive to movement of the second end of the rope in the upward direction along the pole, a gravitational force at the bracket overcomes the frictional force and the bracket moves in the downward direction along the pole to adjust the position of the bracket along the pole.

6. The hanging system of claim 1, wherein the passageway comprises a conical passageway having a larger diameter at a first end of the body and a smaller diameter at a second end of the body.

7. The hanging system of claim 6, wherein, when the bracket is adjustably mounted at the pole and with no external force applied at the rope, a longitudinal axis of the conical passageway is out of alignment with the pole so that the inner surface of the body along the conical passageway engages the pole.

8. The hanging system of claim 7, wherein, responsive to the external force applied at the first portion of the length of the rope, the longitudinal axis of the conical passageway is moved toward alignment with the pole to reduce the frictional force between the bracket and the pole.

9. The hanging system of claim 1, wherein a load applied at the hanging element biases the inner surface of the body toward engagement with the pole.

10. The hanging system of claim 1, wherein the body comprises a first portion and a second portion, and wherein, when the bracket is adjustably mounted at the pole, the first and second portions are joined together around the pole, and wherein the first and second portions comprise respective recesses so that, when the first and second portions are joined together, the respective recesses define the passageway.

11. The hanging system of claim 10, wherein the first and second portions of the body are joined together with biasing fastening members, and wherein the biasing fastening members bias the first and second portions toward engagement with one another to apply a clamping force between the first and second portions onto the pole, wherein the frictional force is due at least in part to the clamping force.

12. The hanging system of claim 11, wherein, as the bracket moves along the pole and the biasing fastening members bias the first and second portions toward engagement with one another, a diameter of the passageway conforms to a diameter of the pole.

13. The hanging system of claim 10, wherein adapters are removably received along inner surfaces of the respective recesses so that, when the first and second portions are joined together, the adapters define an effective diameter of the passageway.

14. The hanging system of claim 10, wherein the arm extends from the first portion, and wherein a second arm extends laterally from the second portion and includes a second hanging element along the second arm and spaced from the second portion of the body.

15. The hanging system of claim 10, wherein the first portion and the second portion comprise common parts.

16. The hanging system of claim 1, wherein the connecting element of the bracket comprises a through hole formed through the arm.

17. The hanging system of claim 16, wherein the through hole is formed through the arm and parallel to the passageway.

18. The hanging system of claim 16, wherein the through hole is formed through the arm and perpendicular to the passageway.

19. The hanging system of claim 1, wherein the channel is formed through the arm.

20. The hanging system of claim 1, wherein the channel is formed through the body and spaced from the passageway.

21. The hanging system of claim 1, wherein the channel is formed through the body and adjacent the passageway.

22. The hanging system of claim 1, wherein, when the inner surface of the body engages the pole, friction resistant pads disposed along the inner surface of the passageway engage the pole.

* * * * *